US012637846B2

(12) United States Patent
Hofman

(10) Patent No.: US 12,637,846 B2
(45) **Date of Patent: *May 26, 2026**

(54) SHOWERHEAD ASSEMBLY WITH INTEGRATED SOAP-SHAMPOO RESERVOIR

(71) Applicant: ETL, LLC, Sparks, NV (US)

(72) Inventor: David Hofman, Sparks, NV (US)

(73) Assignee: ETL, LLC, Sparks, UT (US)

( * ) Notice: Subject to any disclaimer, the term of this patent is extended or adjusted under 35 U.S.C. 154(b) by 275 days.

This patent is subject to a terminal disclaimer.

(21) Appl. No.: 18/228,449

(22) Filed: Jul. 31, 2023

(65) Prior Publication Data

US 2025/0043552 A1 Feb. 6, 2025

(51) Int. Cl.
*E03C 1/046* (2006.01)
*B05B 1/18* (2006.01)

(52) U.S. Cl.
CPC ................ *E03C 1/046* (2013.01); *B05B 1/18* (2013.01)

(58) Field of Classification Search
CPC ............ E03C 1/046; B05B 1/18; B05B 1/185
See application file for complete search history.

(56) References Cited

U.S. PATENT DOCUMENTS 2,316,781 A * 4/1943 Fox ......................... B01F 25/30 239/417.3
2,596,387 A * 5/1952 Ellinger .................. A47L 17/00 239/314
3,018,969 A 1/1962 Gentry
3,091,402 A 5/1963 Vernon
3,271,809 A * 9/1966 Morawski ............ A46B 11/066 401/281
3,367,580 A 2/1968 Hronas et al.
3,402,892 A * 9/1968 Hugues ................... E03C 1/046 239/312
3,540,625 A 11/1970 Lambe
3,764,074 A * 10/1973 James ..................... E03C 1/046 239/318
3,797,747 A * 3/1974 Buzzi ...................... E03C 1/046 239/311
3,811,618 A * 5/1974 Gartner ................. B05B 7/0425 239/312

(Continued)

FOREIGN PATENT DOCUMENTS

GB 2462819 A 2/2010
KR 10-1006125 B1 1/2011

(Continued)

*Primary Examiner* — Joseph A Greenlund
(74) *Attorney, Agent, or Firm* — ONE LLP

(57) ABSTRACT

An improved showerhead assembly is provided for facilitating the application of soap or shampoo upon a bather. The showerhead assembly is preferably handheld and includes an elongate handle, and a showerhead including a face having one or more nozzles for spraying water. In addition, the showerhead assembly includes a detachable reservoir for storing soap or shampoo. Preferably, the reservoir is detachable from the showerhead by a threaded coupling in which the reservoir includes male threads which can be capped. Preferably, the showerhead assembly includes a controller for allowing one to selectively dispense shampoo or soap from within the reservoir into the stream of water which is ejected from the showerhead nozzles.

16 Claims, 18 Drawing Sheets

(56) References Cited

U.S. PATENT DOCUMENTS 4,009,831 A 3/1977 Arad et al.
4,019,658 A * 4/1977 Consaul .................... B05B 7/12 222/144.5
4,121,773 A 10/1978 Headen et al.
4,193,553 A * 3/1980 Kelly .................... B05B 1/3013 239/525
4,200,206 A * 4/1980 Chase .................... E03C 1/046 222/630
4,211,368 A 7/1980 Legros et al.
4,281,796 A * 8/1981 Fugent ................ F16K 27/0263 239/581.1
4,467,964 A 8/1984 Kaeser
4,607,793 A * 8/1986 Eberle .................. B05B 7/2443 239/434
4,623,095 A * 11/1986 Pronk .................... E03C 1/046 239/311
4,651,930 A * 3/1987 Magaha, Jr. .......... B05B 7/2443 116/DIG. 17
5,071,070 A * 12/1991 Hardy .................. B05B 7/2472 239/311
5,356,076 A * 10/1994 Bishop .................. B05B 7/0425 239/311
5,433,384 A * 7/1995 Chan ...................... B05B 1/085 239/239
5,476,225 A 12/1995 Chan
5,961,049 A * 10/1999 Kaps ...................... E03C 1/046 239/335
6,622,945 B1 * 9/2003 Wu ...................... B05B 1/1654 239/443
7,320,438 B1 * 1/2008 Latin ...................... E03C 1/046 239/588
7,661,607 B1 * 2/2010 Bowden .................. E03C 1/046 239/581.1
11,712,136 B2 * 8/2023 Hofman ................ E03C 1/0409 4/596
2012/0222695 A1 * 9/2012 Suter ...................... F16K 11/20 132/200
2018/0229251 A1 8/2018 Duffus, III
2020/0360947 A1 * 11/2020 Guthrie .................. E03C 1/046
2021/0353111 A1 * 11/2021 Hofman ............... A47K 5/1202
2022/0056678 A1 * 2/2022 Guthrie ............... B01F 35/8822
2024/0189841 A1 * 6/2024 Wei ...................... E03C 1/0408
2024/0286152 A1 * 8/2024 Hofman ................ B05B 3/0417
2025/0043552 A1 * 2/2025 Hofman .................. E03C 1/046
2025/0075477 A1 * 3/2025 Wick .................... E03C 1/0408

FOREIGN PATENT DOCUMENTS

WO WO 2009/051501 A1 4/2009
WO WO 2019/221043 A1 11/2019
WO WO-2020099756 A1 * 5/2020 ........... E03C 1/0409

* cited by examiner

SHOWERHEAD ASSEMBLY WITH INTEGRATED SOAP-SHAMPOO RESERVOIR

CROSS-REFERENCE TO RELATED APPLICATIONS

The present application is a continuation of U.S. patent application Ser. No. 17/150,266, filed Jan. 15, 2021, which claims priority to U.S. Provisional Patent Application No. 63/026,623, filed May 18, 2020, the disclosures of which are hereby incorporated by reference in their entireties for all purposes.

BACKGROUND OF THE INVENTION

The present invention relates to showerheads.

Showerheads are commercially available in numerous designs and configurations for use in showers, faucets, spas, sprinklers and other personal and industrial systems. The vast majority of showerheads include spray heads which may be categorized as being either stationary or oscillating and have either fixed or adjustable openings. Stationary spray heads with fixed jets are the simplest constructions consisting essentially of a central conduit connected to one or more spray nozzles directed to produce a constant pattern. The stationary spray showerheads cause water to flow through the construction to contact essentially the same points on a user's body in a repetitive fashion.

Multifunction showerheads are able to deliver water in many different spray patterns such as a fine spray, a coarse spray, a pulsating spray, or even a flood pattern providing high fluid flow but decreased velocity. Of course, many other spray patterns may also be provided.

A conventional multifunction showerhead generally requires the user to turn a selector ring or dial on the showerhead faceplate in order to select a desired function. Other common constructions include a faceplate with spray jets located in concentric circular patterns. An internal controller, such as controlled by buttons or the like, may be operated to direct the incoming water to any of the various patterns. Examples of such constructions are disclosed in U.S. Pat. Nos. 5,433,384 and 6,622,945.

A handheld showerhead assembly typically includes a hollow handle connected to a water supply by a flexible rubber hose. The handle has a proximal end which typically has a threaded inlet for connecting to a rubber hose. Meanwhile, at the handle's distal end, the showerhead assembly includes a showerhead including a plurality of nozzles for ejecting water. Typically, the handle and showerhead face are angled relative to one another so that water is ejected at approximately 90° relative to the handle's longitudinal axis.

Advantageously, the showerhead handle allows users to manipulate the spray nozzles into various positions and alignment to assist in the cleaning process. Unfortunately, though handheld showerheads provide many advantages compared to their fixed showerhead counterpart, handheld showerheads still suffer from several disadvantages. For example, many handheld shower assemblies do not allow a user to direct water to multiple locations at the same time.

More recently, shower stalls have been provided with a primary showerhead, and additional nozzles which project directly from the shower stall's walls which spray water in different directions than the primary showerhead. Unfortunately, these constructions require that expensive plumbing additions be made to the shower stall facility. Further, the wall nozzles cannot be moved to provide the variety that would be desirable for a shower user.

Bathers often use a variety of soaps, scrubs and shampoos when showering. Unfortunately, this can result in shower stalls being littered with a variety of dispensing bottles. Furthermore, bathers must physically manipulate each bottle to dispense a liquid, such as shampoo.

Thus, it would be advantageous to provide a showerhead assembly that eliminated at least one fluid container from a bathroom shower stall. Furthermore, it would be advantageous to provide a showerhead assembly that facilitated the application of a fluid, such as shampoo or soap, upon a bather.

To this end, numerous attempts have been made to produce a showerhead which incorporated a soap and/or shampoo bottle. These include showerheads described in U.S. Pat. Nos. 3,402,892; 4,211,368; and 7,661,607 among others. These showerhead constructions typically entail integrating or attaching a reservoir, holding soap or shampoo, to the fixed or handheld showerhead. One or more conduits allow the liquid within the reservoir to drip or flow into the water stream before being expelled from the showerhead.

Unfortunately, these constructions are prone to clogging or do not allow the liquids within the reservoir to thoroughly mix with water before being expelled from the showerhead nozzles. This can result in the uneven distribution of the liquid soap or shampoo from the nozzles Furthermore, the lack of mixing can result in clogged conduits.

Therefore, it would be desirable to provide an improved showerhead with integrated reservoir for storing a liquid that provided improved mixing of the stored liquid with water prior to the mixture being expelled from the showerhead nozzles.

Moreover, it would be desirable to provide a showerhead assembly that did not require expensive modifications to the traditional shower stall architecture such as the introduction of additional plumbing within the walls of the shower stall.

SUMMARY OF THE INVENTION

Briefly, in accordance with the invention, an improved showerhead apparatus is provided which includes a hollow handle, a housing, a disengagable reservoir which stores soap or shampoo and is connected to the showerhead housing by a transition section, and a controller assembly so as to selectively allow fluid to pass through the assembly and expel out the nozzles.

Like typical handheld showerhead apparatus, the showerhead apparatus of the present invention includes an elongate hollow handle having a central channel. The handle has a proximal end which preferably is threaded for connecting to a traditional flexible hose which in turn is connectable to a water supply, such as a pipe projecting from a shower stall. Additionally, the central channel is in fluid connection with the showerhead's primary water conduit so as to release water from a primary outlet hole for expelling water to the showerhead. Like traditional handheld showerhead assembly, the handle extends longitudinally, defining an axis by which the showerhead face and resulting spray are angled so as to be more manageable within a shower. Preferably, the showerhead is positioned to be at an angle, such as 45° to 90° relative to the handle's longitudinal axis.

Additionally, the preferred showerhead can be relatively traditional in construction including a housing and a face having nozzles. In some embodiments, the face comprises supplementary nozzles. Preferably, the showerhead includes a cavity which is formed between the face and a cavity wall.

The cavity wall comprises an inlet diverter which is connected to the primary outlet hole so as to receive water from the hollow handle and allow such water to travel into the cavity. Specifically, the inlet diverter causes such water to be projected throughout the cavity in an orthogonal fashion instead of being expelled directly through the showerhead's nozzles. Furthermore, water pressure in the cavity allows for uniform water dispersal through the showerhead's nozzles.

The cavity wall further comprises an inlet hole in fluid connection with an inlet conduit, and an outlet hole in fluid connection with an outlet conduit. Additionally, the inlet conduit and outlet conduit are in fluid connection with a transition section which connects the showerhead to a reservoir. In the preferred embodiment, the reservoir includes male threads so as to be engagable and disengagable with the female threads formed on the exterior of the transition section. The detachable reservoir allows for the user to introduce shampoo or soap into a central chamber residing within the reservoir. Preferably, the detachable reservoir includes a cap so as to allow for separate storage of the reservoir from the showerhead.

In the preferred embodiment, the reservoir includes a housing which forms the central chamber for storing soap or shampoo and accepts water from the inlet conduit. Specifically, water is capable of passing from the cavity through the inlet hole and into the inlet cavity so as to enter the reservoir chamber and mix with fluid previously located therein, such as soap or shampoo. Subsequently, the mixture of fluid with water is capable of exiting the chamber through the outlet conduit so as to enter the cavity through the outlet hole.

Preferably, the showerhead assembly further comprises a controller assembly having an obstructer plate and button, which allows the inlet diverter, inlet hole, and outlet hole to be selectively covered and uncovered so that water and fluid may accordingly pass through the showerhead assembly. Specifically, the plate is rotatably attached to the cavity wall by a pin which passes through a circular hole formed in the cavity wall. More specifically, the obstructer plate includes a plate inlet hole and plate outlet hole. The pin allows the plate to rotate upon an axis so as to enable one to selectively align the plate inlet hole with the cavity wall inlet hole, thereby enabling the passage of water to the reservoir chamber. Further, in this rotation, the plate outlet hole is selectively aligned with the cavity wall outlet hole, thereby enabling the flow of fluid mixture to the cavity.

In some embodiments, the obstructer plate further includes a tab. Specifically, in these embodiments, the tab can be made to selectively align and block the flow of water from the inlet diverter. In some preferred embodiments, the tab only partially blocks the inlet diverter so as to enable the supply of water from the handle to at least trickle into the cavity and expel from the nozzles, thereby maintaining a constant water pressure. In other embodiments, the showerhead assembly further comprises a flow setting assembly which includes a diverter plate. Specifically, the diverter plate can include a tab configured to variably align and/or block the flow of water from the inlet diverter. In this manner, the diverter plate's tab allows the water pressure and/or flow to vary. In these embodiments, water can flow through showerhead assembly and expel from the one or more nozzles independent of the positioning of the obstructer plate.

In some embodiments, rotation of the controller assembly is accomplished by way of a button and a lever arm. In some embodiments, the button is a slidable button. In some embodiments, the button is a push button. Those of skill in the art will recognize that other controller assembly features and buttons can be utilized without departing from the scope of this disclosure. Additionally, and preferably, the lever arm has a hole keyed to accept the obstructer plate's pin.

Furthermore, in some preferred embodiments, the controller assembly provides three settings. Upon the user manually sliding the button to the first setting position, the obstructer plate is selectively rotated so that the plate's inlet hole and outlet hole are not aligned with the cavity wall's inlet hole and outlet hole. Consequently, this unaligned configuration prevents water and fluid flow through the inlet conduit and outlet conduit, respectively. In the first setting position, the tab does not block the inlet diverter and water is capable of entering the cavity and thereby spraying through the showerhead nozzles.

In some preferred embodiments, upon the user manually sliding the button to the second setting position, the obstructer plate is selectively rotated so as to properly align the plate's inlet hole and outlet hole with the cavity wall's inlet hole and outlet hole. In this second setting, the tab does not block the water flowing through the inlet diverter. As a result, water entering the cavity from the handle is capable of traveling through the inlet conduit and entering the reservoir chamber. This water mixes with the fluid located within the reservoir chamber so as to produce a mixture which then flows from the chamber through the outlet conduit. Consequently, the outlet conduit transports this mixture into the cavity, wherein the mixture is additionally mixed with water entering the cavity through the inlet diverter. Thereafter, the new mixture is expelled through the nozzles.

In some preferred embodiments, and in accordance with the user sliding the button to the third setting position, the plate is selectively rotated so as to block the cavity wall's inlet hole and outlet hole. The inlet conduit and outlet conduit remain blocked in this rotated position so as to prevent any fluid within the reservoir from entering the cavity. Alternatively, the tab is positioned so as to only partially obstruct the inlet diverter, thereby allowing only a trickle of water to enter the cavity through the handle. Therefore, water trickling into the cavity is expelled through the nozzles.

In other preferred embodiments, the controller assembly provides two settings. In the first setting, or when the button has not been pressed by a user, the obstructer plate is selectively rotated so that the plate's inlet hole and outlet hole are not aligned with the cavity wall's inlet hole and outlet hole. In this first setting, though water is capable of entering the cavity from the hollow handle and then expelling through the nozzles, any soap or shampoo within the reservoir is not capable of being introduced into the flow of water expelled from the nozzles.

Further, in some embodiments, in the second setting, or when the user has depressed downwardly onto the button, the obstructer plate is selectively rotated so as to properly align the plate's inlet hole and outlet hole with the cavity wall's inlet hole and outlet hole. In this second setting, water entering the cavity from the handle is capable of traveling through the inlet conduit and entering the reservoir chamber. As such, water mixes with the soap or shampoo within the reservoir before then travelling through the outlet conduit to once again enter into the cavity for expellation therefrom.

Thus, it is an object of the present invention to provide a showerhead assembly having an improved construct so as to facilitate the application of a fluid, such as shampoo or soap, onto the user.

Furthermore, it is an additional object of the present invention to provide a showerhead assembly that provides a controller for allowing the user to selectively dispense fluid into the stream of water being ejected from the showerhead nozzles.

Other features and advantages of the present invention will be appreciated by those skilled in the art upon reading the detailed description which follows with reference to the drawings.

DETAILED DESCRIPTION OF THE INVENTION

Figure 1:
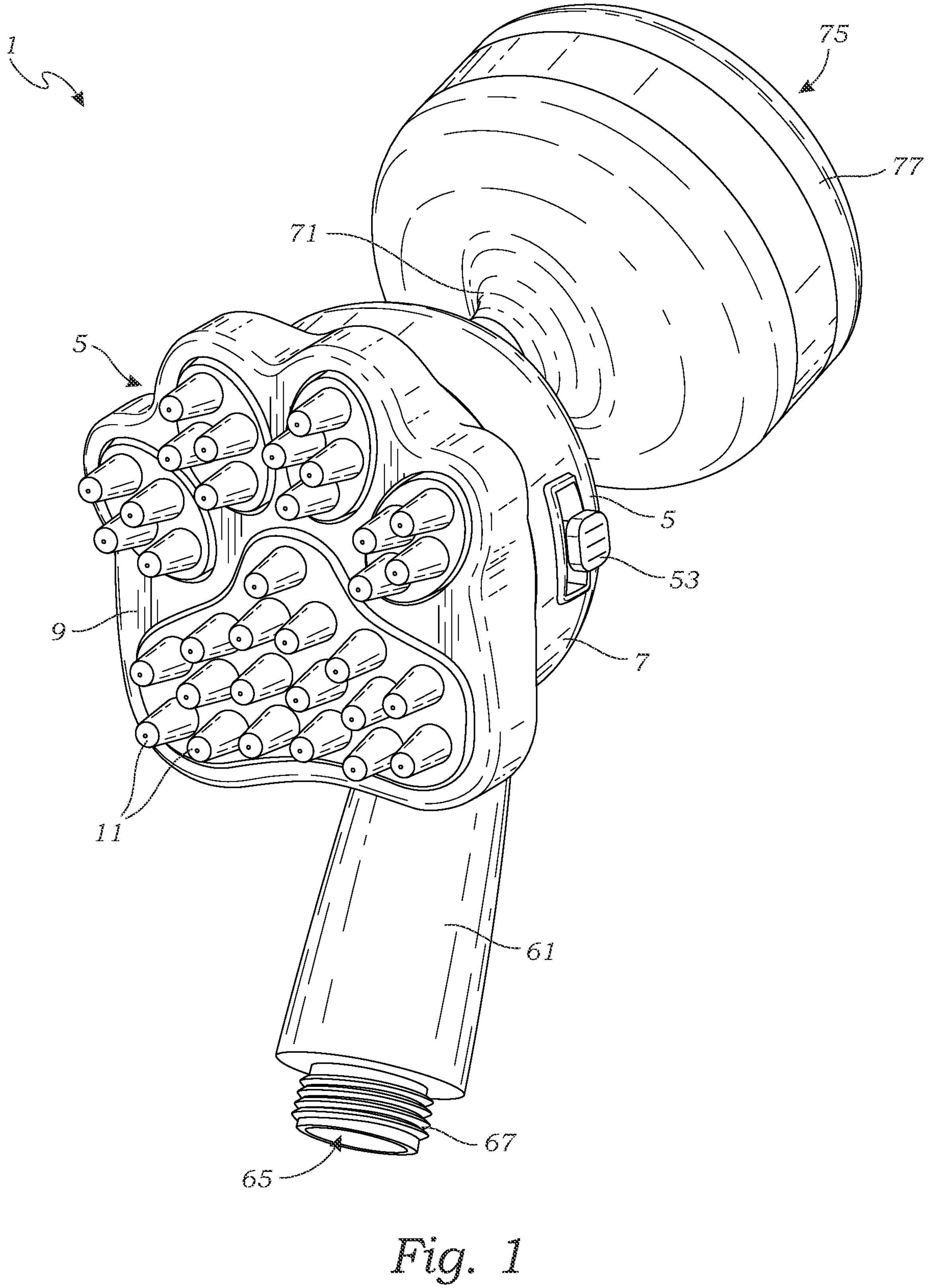
FIG. 1 is a front perspective view of an exemplar embodiment of a showerhead assembly.
Figure 2:
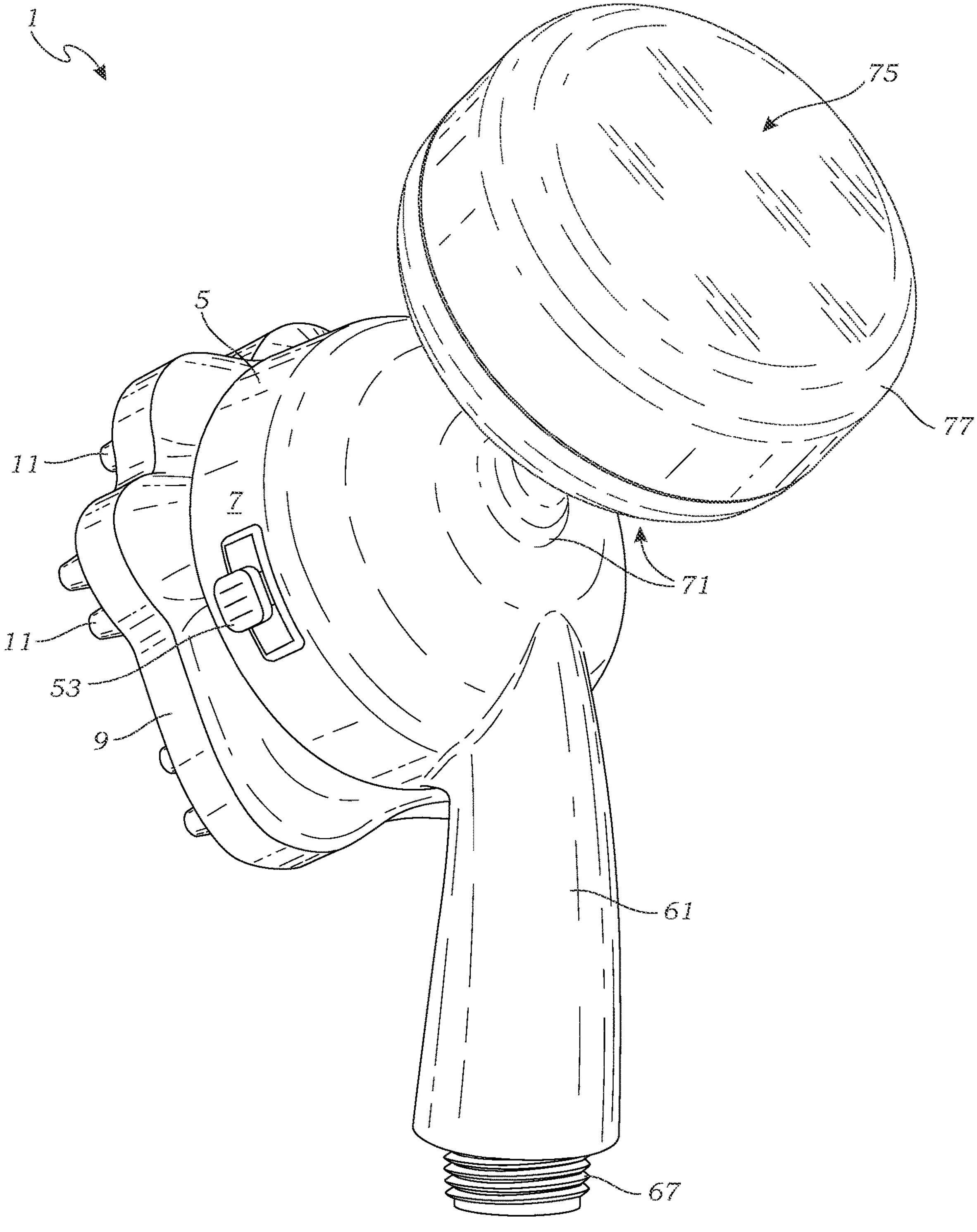
FIG. 2 is a rear perspective view of an exemplar embodiment of a showerhead assembly.
Figure 3:
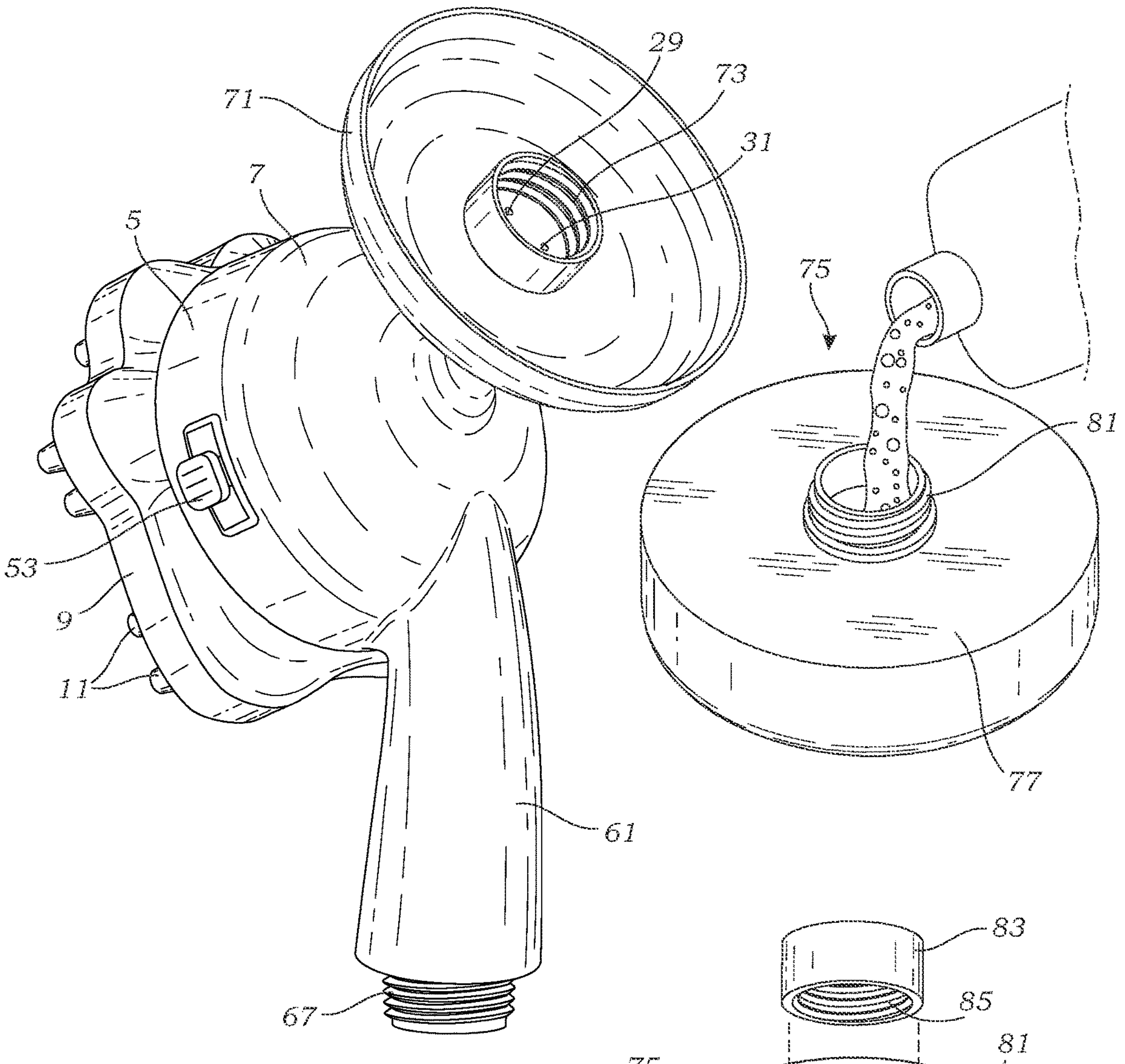
FIG. 3 is a rear perspective view of an exemplar embodiment of a showerhead assembly with its reservoir removed.

The present invention addresses the aforementioned disadvantages by providing an improved showerhead assembly. While the showerhead assembly is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-25, the showerhead assembly 1 includes a showerhead 5 having a traditional appearance including a housing 7 and a face 9. The face 9 includes nozzles 11 of any type as can be selected for providing a shower experience. In some embodiments, and as best shown in FIGS. 11, and 17-19, the face 9 can further include one or more supplementary nozzles 111 that are configured to disperse water in a different spray type than nozzles 11. For example, the supplementary nozzle(s) 111 can be configured to disperse water in a waterfall fashion, whereas nozzles 11 can be configured to disperse a discrete spray of water or, collectively, spray water so as to create a wide, flat stream. In some preferred embodiments, and as shown in FIGS. 11, and 17-19, the face 9 can include 44 nozzles 11 and one supplementary nozzle 111. Those of skill in the art will recognize that various other types and/or number of nozzles 11, 111 can be utilized without departing from the scope of this disclosure.

Figure 11:
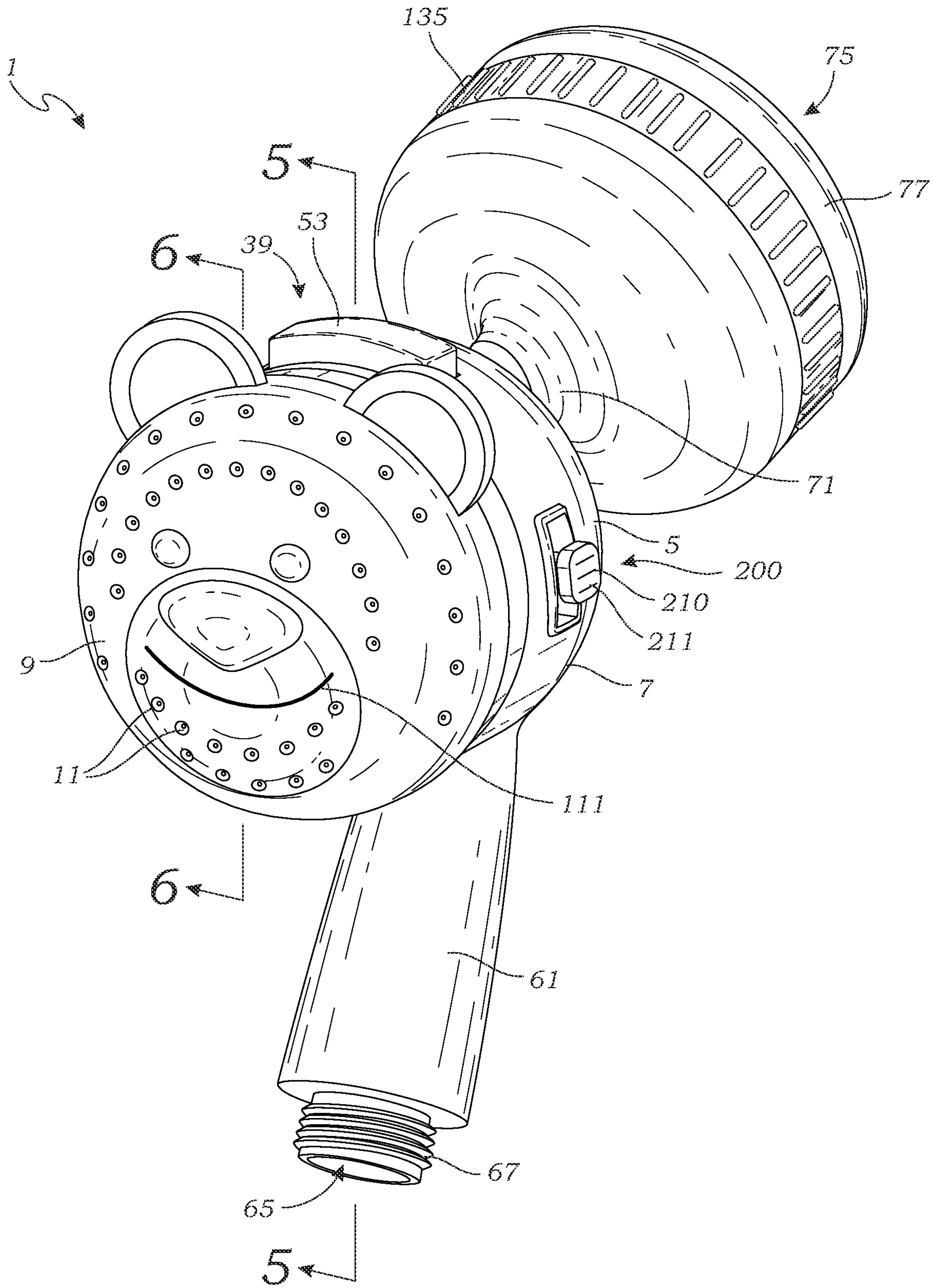
FIG. 11 is a front perspective view of an exemplar embodiment of a showerhead assembly.

In some embodiments, and with reference to the showerhead assembly depicted in, e.g., FIG. 11, the face 9 can be rotated along a central axis of the housing 7 (rotation of the face 9 not depicted in FIG. 11). Specifically, the spray setting of the showerhead assembly 1 can change in response to rotation of the face 9. More specifically, though not illustrated, a user can transition between different spray settings by rotating the face 9 along the central axis. Even more specifically, in some preferred embodiments, the user can transition between a first spray setting (e.g., a waterfall spray setting) and a second spray setting (e.g., a wide-stream spray setting) by rotating the face 9. Even more specifically, in some embodiments, when the face 9 is positioned at 0° relative to the central axis (as shown in FIG. 11), the first spray setting can be utilized (e.g., the waterfall spray setting). Further, though not shown, in some embodiments, when the face 9 is positioned at or rotated to 45° relative to the central axis, the second spray setting can be utilized (e.g., the wide-stream spray setting). Those of skill in the art will appreciate that other angles and spray settings can be utilized without departing from the scope of this disclosure.

With reference to FIGS. 1-25, the showerhead 5 may be constructed to connect directly to a threaded pipe typically found in a shower stall. However, as illustrated in the Figures, the preferred showerhead 5 is of the handheld type and thus the showerhead assembly 1 includes a hollow handle 61. The handle 61 extends longitudinally to create a longitudinal axis. Preferably, the showerhead's face 9 is positioned to be at an angle, such as 45° to 90° relative to the handle's longitudinal axis. Furthermore, the handle 61 includes a central channel 65 for transporting water to the showerhead 5. The handle's proximal end includes male threads 67 for connecting to a flexible hose (not shown). Meanwhile, the showerhead 5 is affixed to the distal end of the handle 61.

Figure 5:
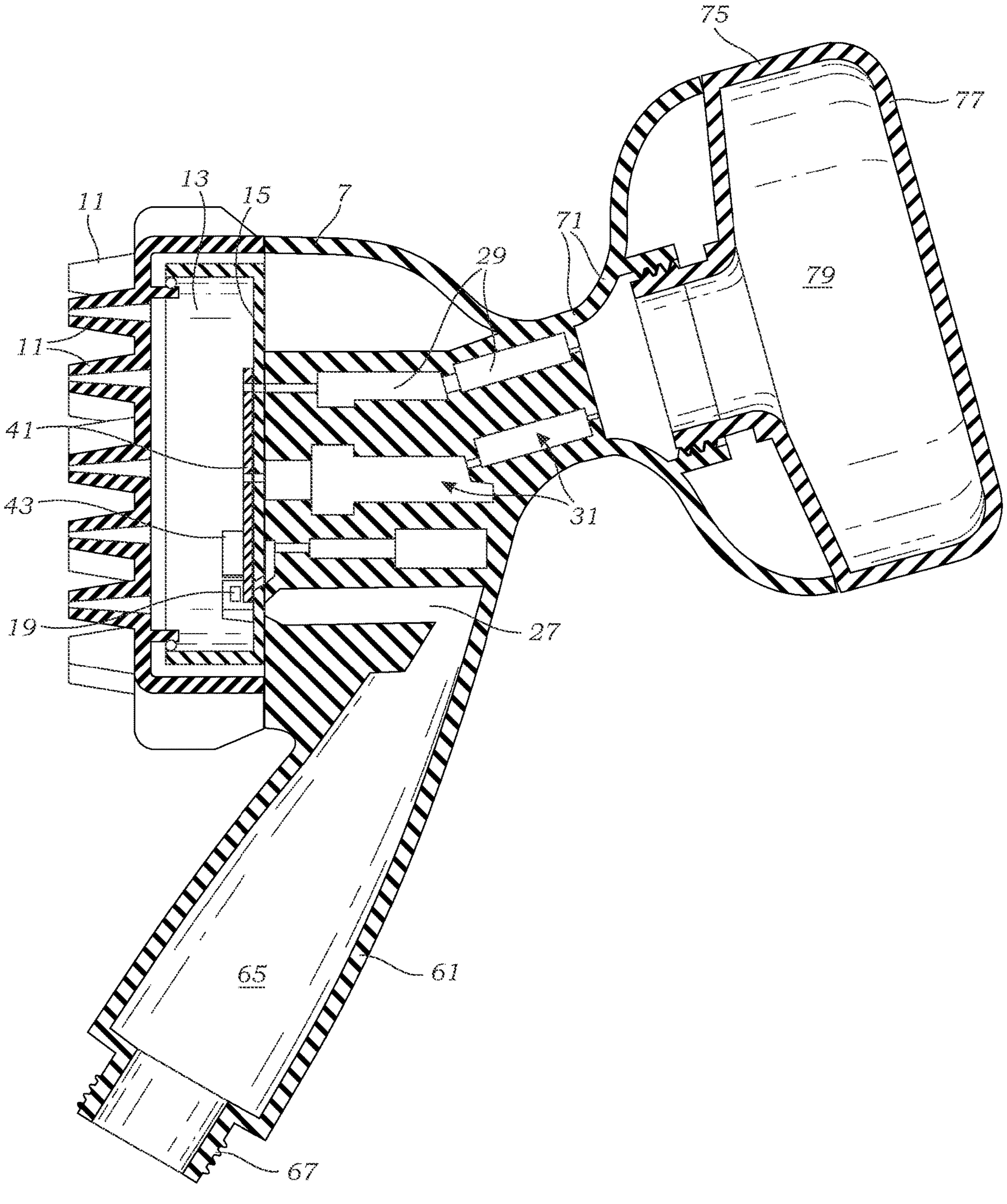
FIG. 5 is a side cut-away view of an exemplar embodiment of a showerhead assembly.
Figure 15:
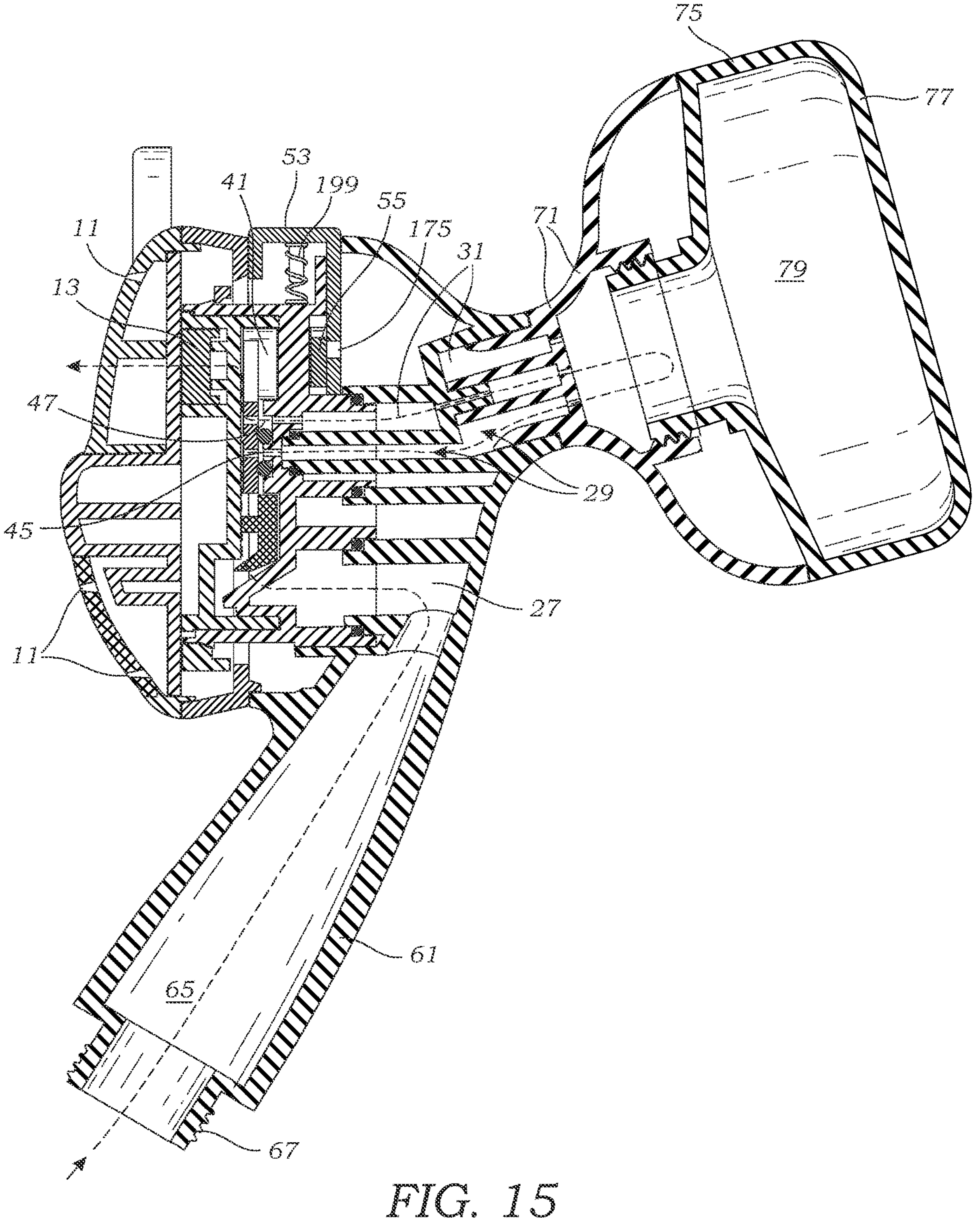
FIG. 15 is a side cut-away view of an exemplar embodiment of a showerhead assembly, illustrating the flow of water.
Figure 16:
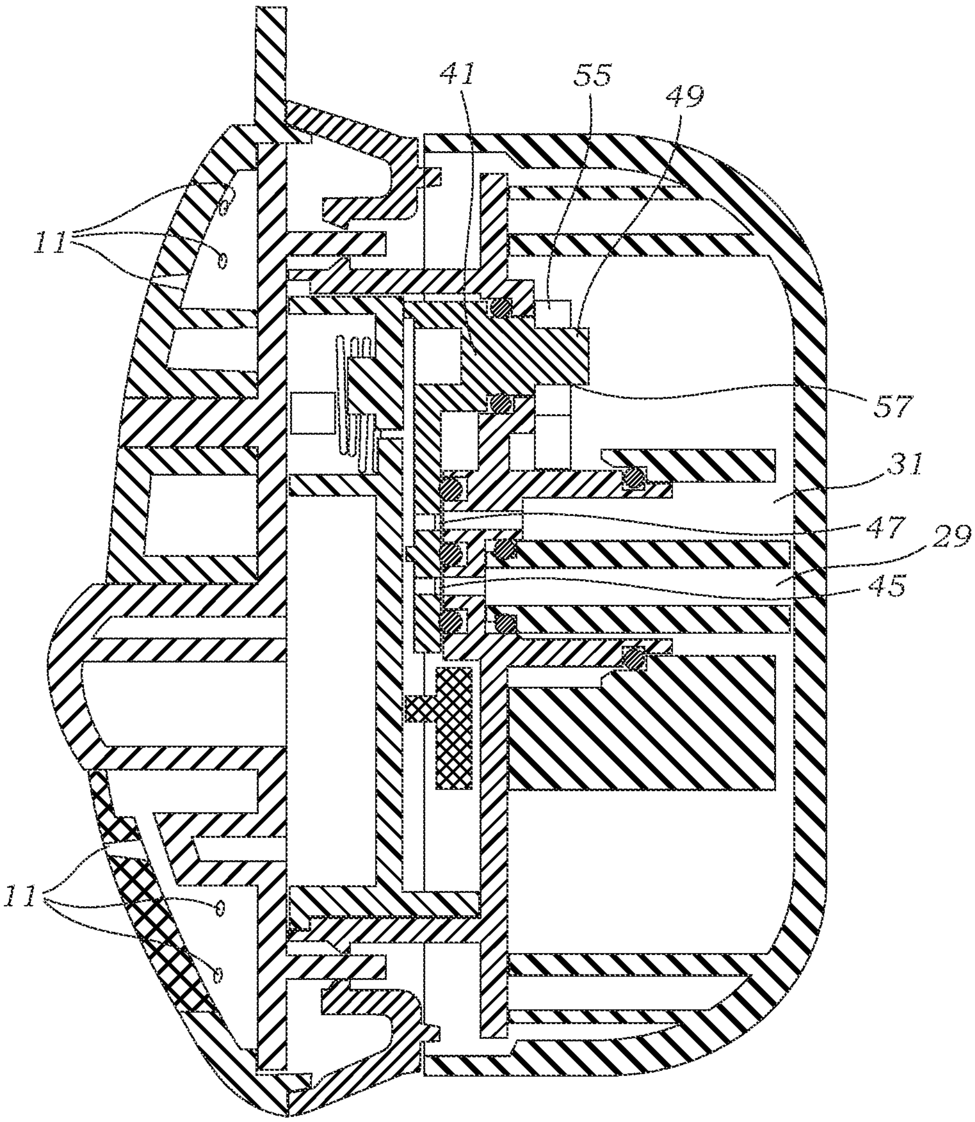
FIG. 16 is a side cut-away view of an exemplar embodiment of a showerhead assembly's showerhead.

As best illustrated in FIGS. 5 and 15, the handle's channel 65 supplies water to the showerhead 5. As further illustrated in FIGS. 6, 15, 17, and 18, the showerhead 5 includes a primary water conduit 27 which transports water from the handle's channel 65 to a cavity 13 formed within the showerhead 5. As best illustrated in FIGS. 5 and 15, water from a water source travels up the handle's channel 65 before being diverted into the primary water conduit 27. The showerhead's primary conduit 27 then supplies water to the cavity 13 which is formed between a cavity wall 15 and the showerhead's face 9. Further, cavity wall 15 can comprise a primary outlet hole 17 (best shown in, e.g., FIG. 10) connected to the primary conduit 27 to allow water to travel from the primary conduit 27 into the cavity 13. Preferably, the showerhead assembly 1 includes an inlet diverter 19 which causes the water entering into the cavity 13 to be directed orthogonally throughout the cavity 13 instead of directly to the showerhead's nozzles 11. Water pressure in the cavity 13 causes water to be expelled uniformly through the showerhead's nozzles 11.

Figure 4:
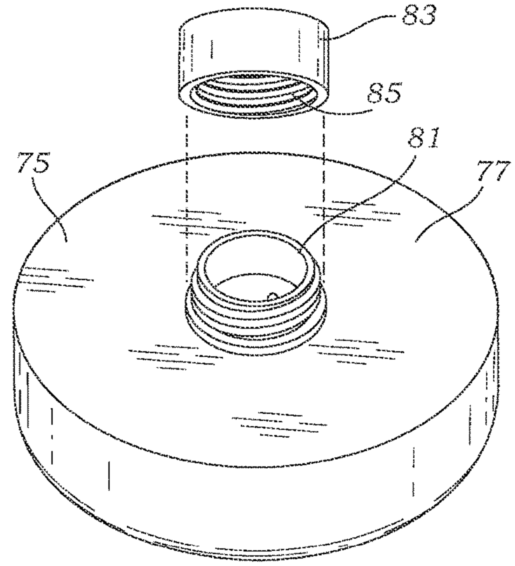
FIG. 4 is a rear perspective view of an exemplar embodiment of a showerhead assembly's reservoir removed for sealing with a cap.
Figure 12:
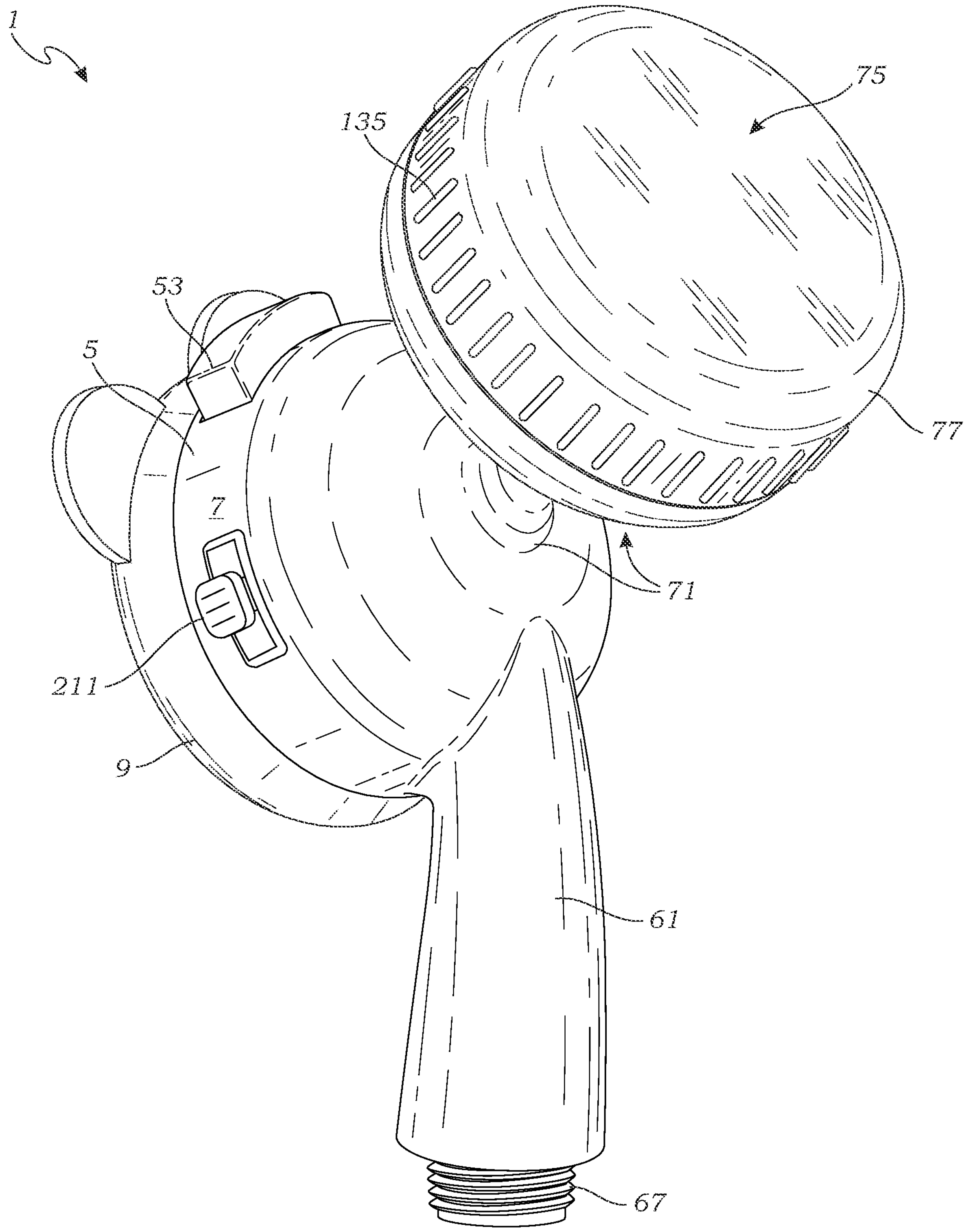
FIG. 12 is a rear perspective view of an exemplar embodiment of a showerhead assembly.
Figure 13:
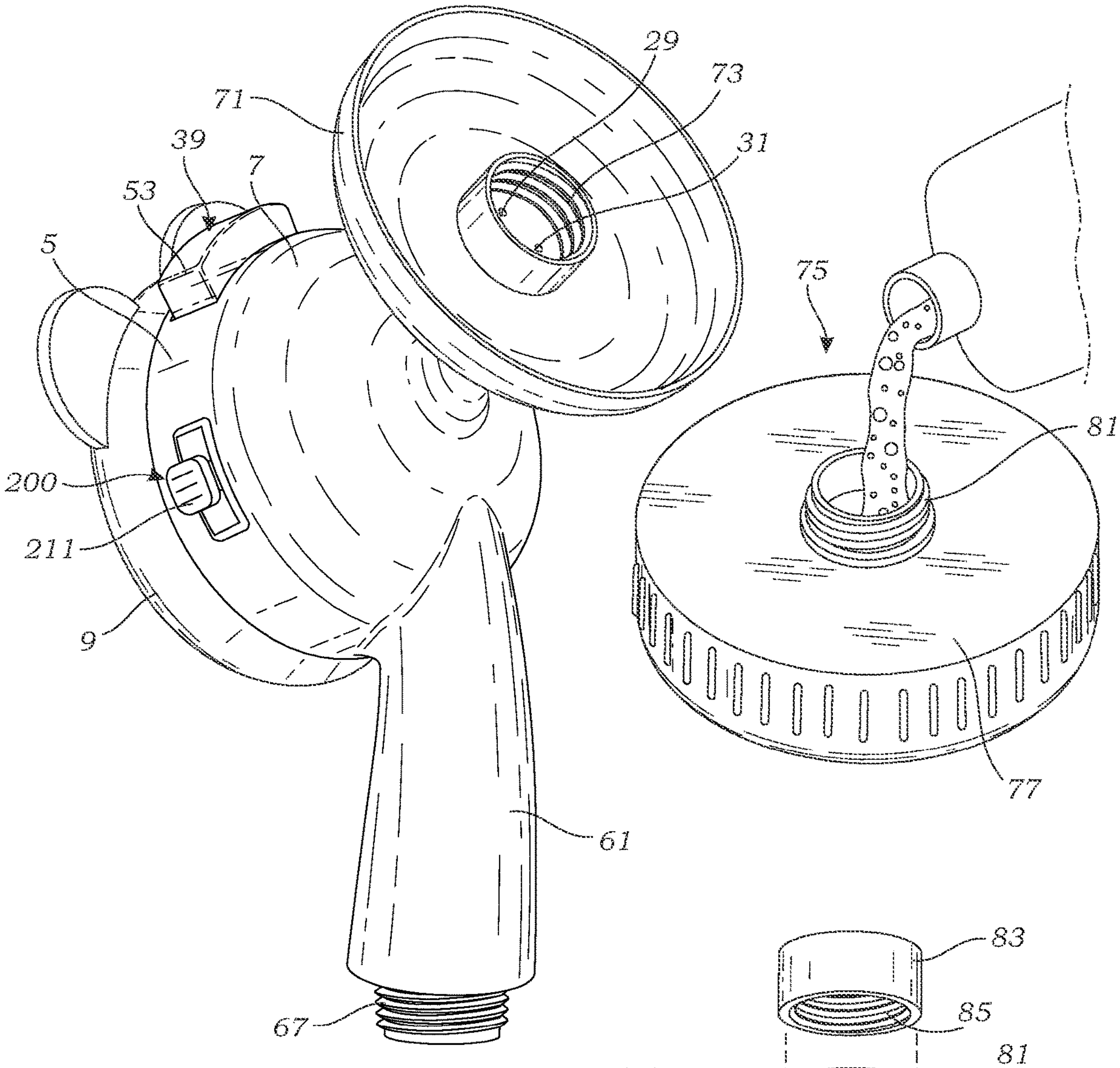
FIG. 13 is a rear perspective view of an exemplar embodiment of a showerhead assembly with its reservoir removed.
Figure 14:
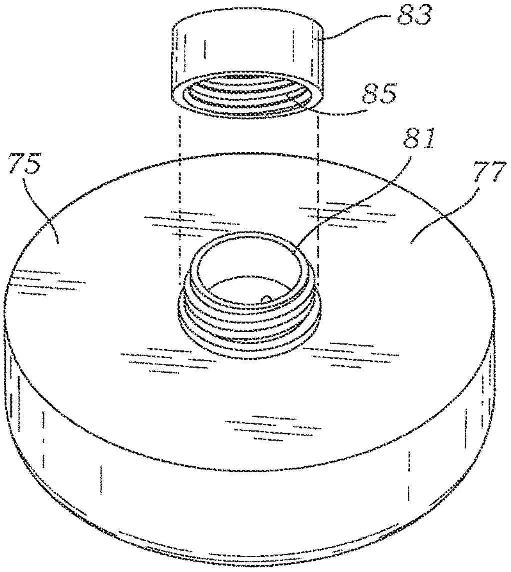
FIG. 14 is a rear perspective view of an exemplar embodiment of a showerhead assembly's reservoir removed for sealing with a cap.

The showerhead assembly 1 further includes a reservoir 75 for storing soap or shampoo. The reservoir 75 includes a housing 77 which forms a central chamber 79 in which the soap or shampoo is located. The reservoir 75 is connected to the showerhead 5 by a transition section 71. Preferably, the reservoir 75 is connectable and disconnectable to the transition section 71 by providing the reservoir 75 with male threads 81 which threadably connect to female threads 73 formed on the exterior of the transition section 71. As illustrated in FIGS. 3, 4, 13, and 14, preferably, the reservoir 75 can be detached from the rest of the showerhead assembly 1 for the introduction of shampoo, soap, or any fluid or substance of the like, into the reservoir's chamber 79. In some embodiments, and as best shown in FIGS. 11 and 12, an exterior portion of the housing 77 can comprise a gripping surface 135 configured to be gripped by a user. In this manner, the user can rotate the housing 77 relative to the transition section 71 by gripping the gripping surface 135 so as to detach the housing 77. In preferred embodiments, and as best depicted in FIGS. 4 and 14, the showerhead assembly 1 may include a cap 83 so that the shampoo or soap may be stored separately from the showerhead 5. Advantageously, soap or shampoo may be prepackaged and sold separately in a capped container 75 wherein the container's male threads 81 are constructed for connecting to the showerhead assembly's transition section 71.

The showerhead assembly's reservoir 75 is connected to the showerhead assembly's cavity 13 (see, e.g., FIGS. 5 and 15) by an inlet conduit 29 and an outlet conduit 31. Any water in the cavity 13 is capable of passing through an inlet hole 21 formed in the cavity wall 15 into the inlet conduit 29 so as to enter the reservoir's chamber 79. Water entering the reservoir 75 is capable of mixing with any fluid previously located within the reservoir, such as soap or shampoo. Thereafter, the mixture of water and soap or shampoo is then capable of re-entering the cavity 13 by traveling through outlet conduit 31 through an outlet hole 23 formed in the cavity wall 15.

Preferably, the showerhead assembly includes a controller assembly 39 for selectively allowing water to pass through the transition section 71 into and out from the reservoir 75 so as to selectively allow shampoo or soap to enter to the showerhead assembly's cavity 13, and in turn to be sprayed from the nozzles 11 and/or 111. The controller assembly 39 may comprise various switching apparatus or button mechanisms as can be determined by those skilled in the art. However, as illustrated in the Figures, the preferred controller assembly 39 includes an obstructer plate 41 which can be selectively rotated to cover the cavity wall's inlet hole 21 and outlet hole 23.

A First Embodiment of the Controller Assembly

As best illustrated in FIGS. 6-10, the controller assembly 39 can include an obstructer plate 41 comprising a plate inlet hole 45, a plate outlet hole 47, and a tab 43 configured to cover the cavity wall's inlet diverter 19. The obstructer plate 41 is rotatably attached to the cavity wall 15 by a pin 49 which passes into a circular hole 25 formed in the cavity wall 15. The obstructer plate 41 is capable of rotating about an axis defined by the pin 49 so as to enable one to selectively align the plate inlet hole 45 with the cavity wall inlet hole 21, and selectively align the plate outlet hole 47 with the cavity wall outlet hole 23. Once these holes are properly aligned, water from within the cavity 13 is capable of travelling through these holes. Furthermore, when the holes are aligned, water travels through the inlet conduit 29 so as to allow a mixture of water and shampoo or soap to form in the reservoir. The mixture of water and shampoo or soap then passes through outlet conduit 31 back into the cavity 13 so as to be dispensed from nozzles 11.

When shampoo or soap is not intended to be sprayed from the nozzles 11, the obstructer plate 41 is rotated so that plate inlet hole 45 does not align with the cavity wall inlet hole 21, and the plate outlet hole 47 does not align with the cavity wall outlet hole 23. Similarly, the plate's tab 43 can be made to align and block the flow of water from the inlet diverter 19. Preferably, the tab 43 only predominantly, but does not totally, block the supply of water through the inlet diverter 19 so that at least a trickle of water continues to be expelled from the nozzles 11 so as to maintain constant water temperature that is being expelled from the nozzles 11.

Figure 6:
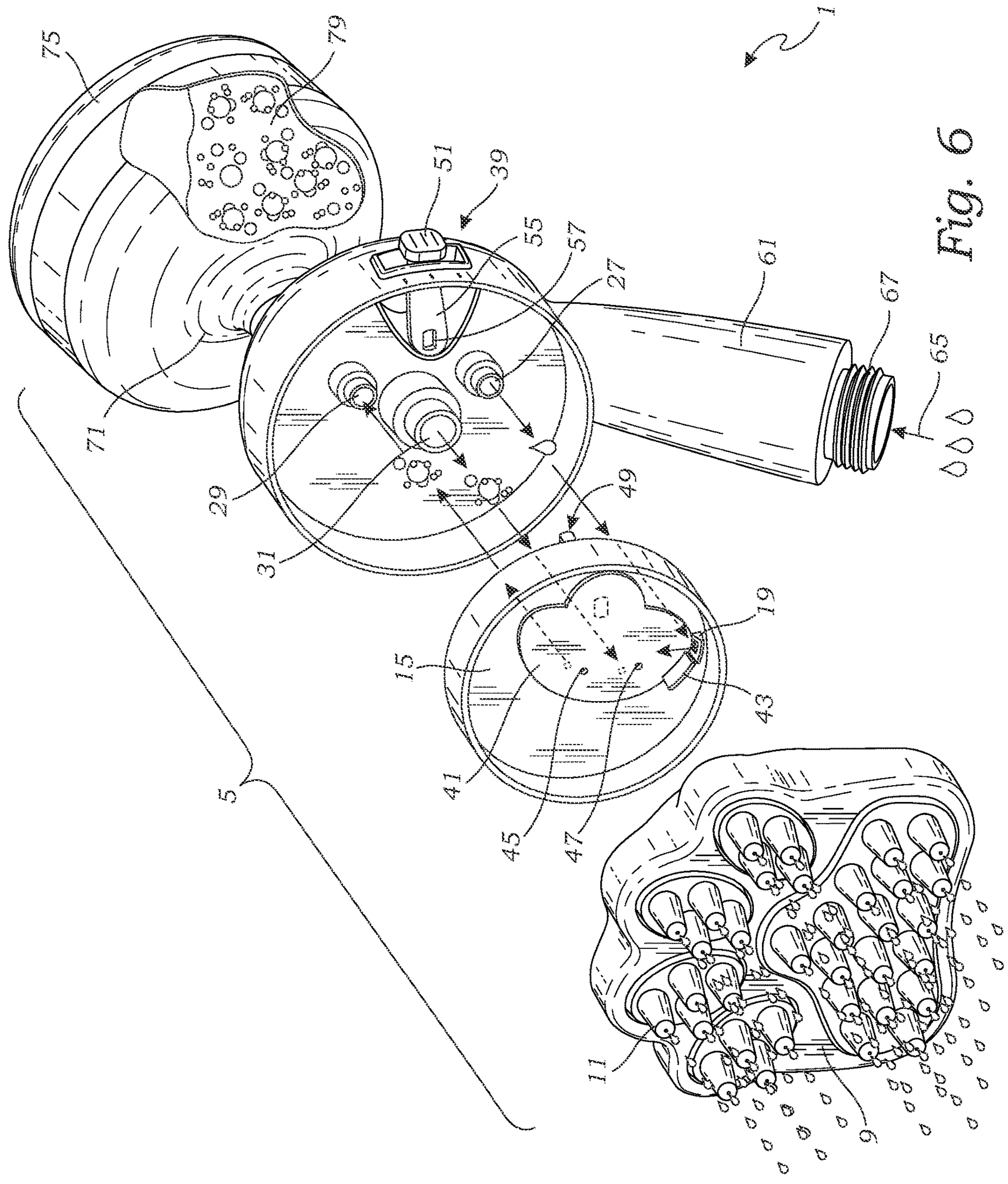
FIG. 6 is an exploded front perspective view of an exemplar embodiment of a showerhead assembly illustrating the application of shampoo function being disabled.
Figure 7:
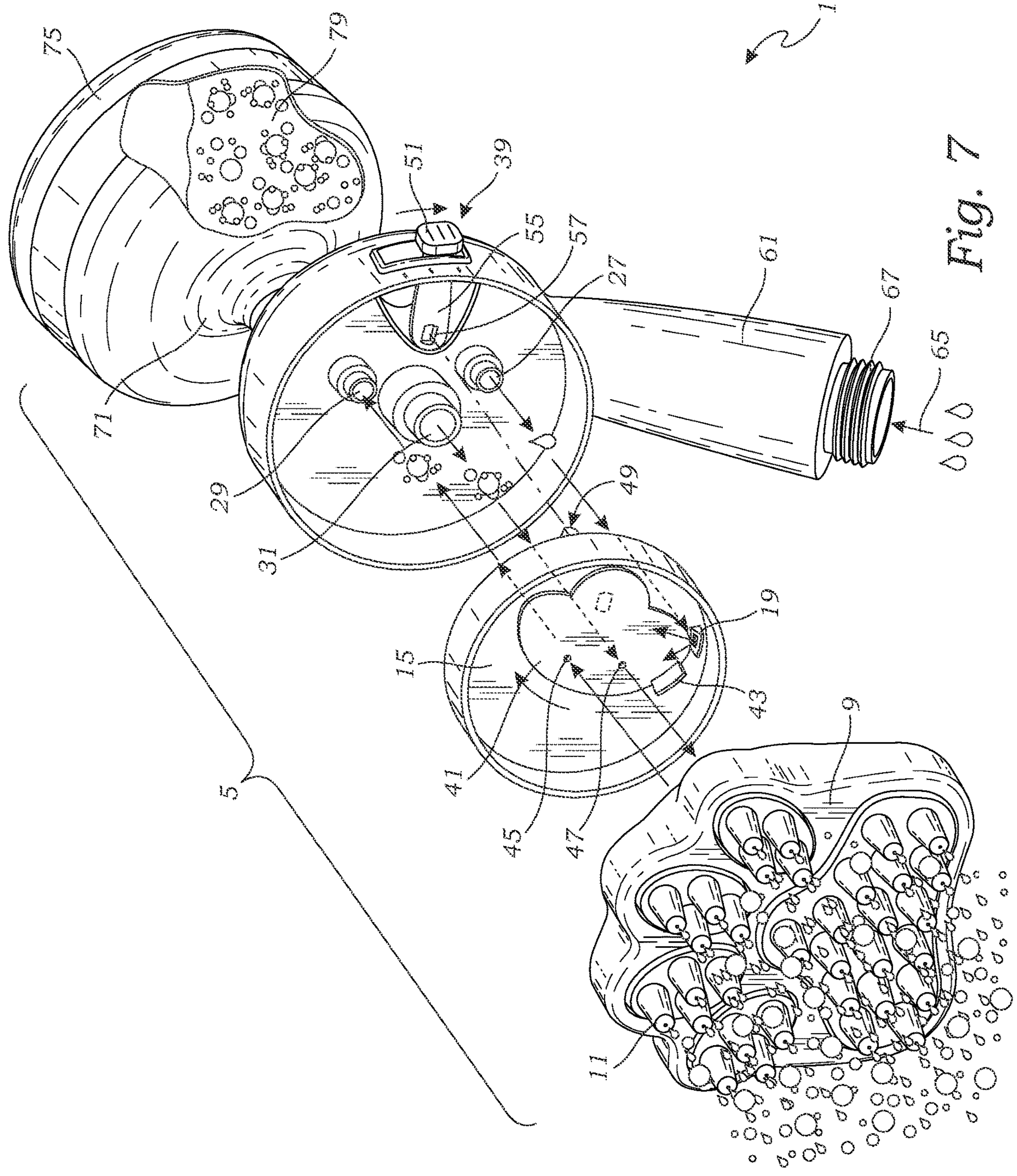
FIG. 7 is an exploded front perspective view of an exemplar embodiment of a showerhead assembly illustrating the application of shampoo function being enabled.
Figure 8:
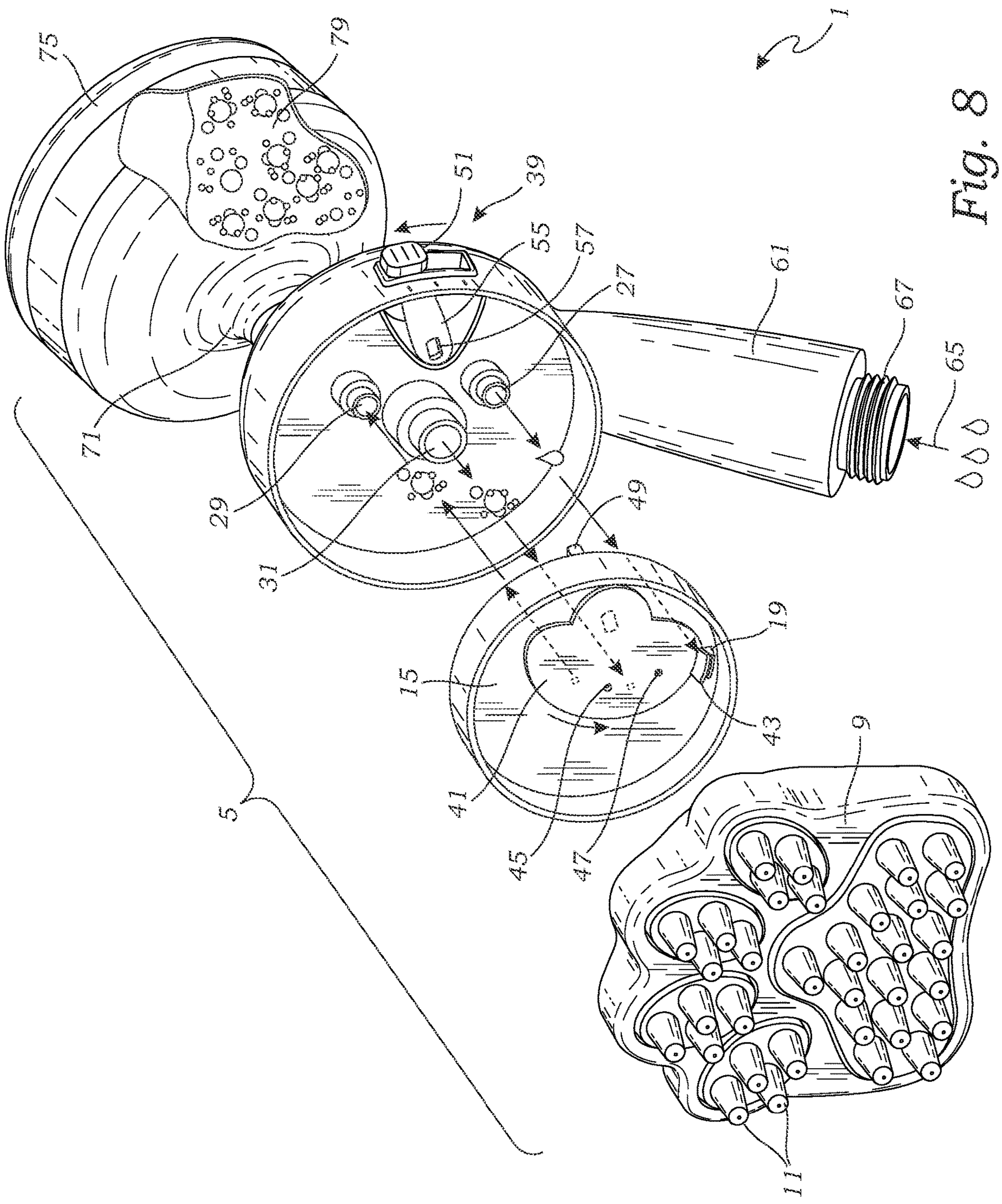
FIG. 8 is an exploded front perspective view of an exemplar embodiment of a showerhead assembly illustrating the application of shampoo function and primary fluid flow being disabled.
Figure 9:
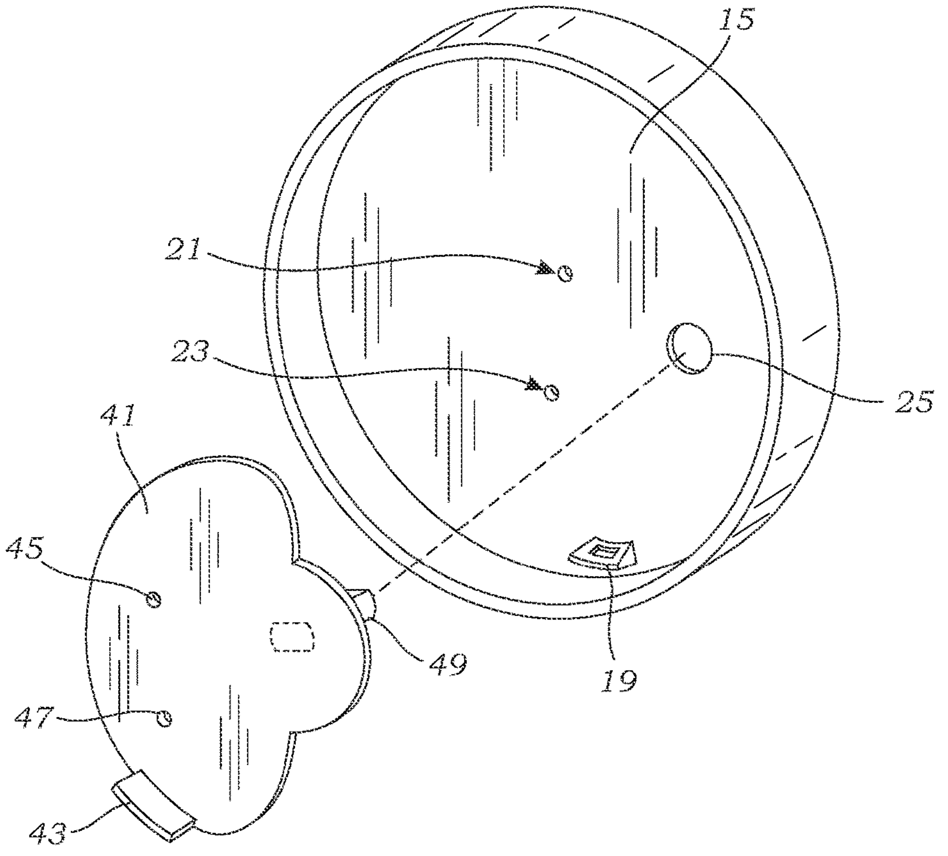
FIG. 9 is an exploded front perspective view of an exemplar embodiment of a showerhead assembly's preferred controller including cavity wall and obstructer plate.
Figure 10:
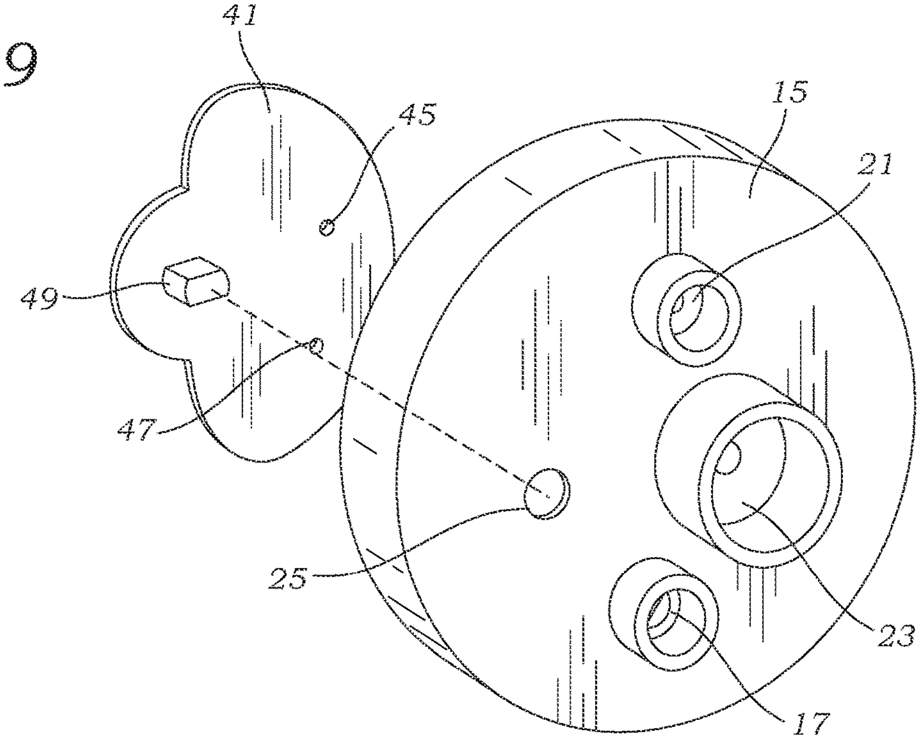
FIG. 10 is an exploded rear perspective view of an exemplar embodiment of a showerhead assembly's preferred controller including cavity wall and obstructer plate.

Rotation of the controller assembly's plate 41 is controlled by a switch 51 having a button 53 and a lever arm 55. In some preferred embodiments, the button 53 is a slidable button 53. Preferably, the lever arm 55 has a hole 57 which is keyed to accept the plate's pin 49. As illustrated in FIGS. 6-8, the controller assembly 39 preferably provides three settings. As illustrated in FIG. 6, when the button 53 is positioned in a first setting, the plate's inlet hole 45 and outlet hole 47 are not aligned with the cavity wall's inlet hole 21 and outlet hole 23 so that water is prevented from flowing through the inlet conduit 29 and outlet conduit 31. However, the plate's tab 43 does not block the inlet diverter 19 so that water is capable of entering the cavity 13 from the hollow handle 61, and the water is then expelled through nozzles 11. However, any soap or shampoo within the reservoir 75 is not capable of being introduced into the flow of water expelled from the nozzles.

In a second setting illustrated in FIG. 7, the switch's button 53 is depressed downwardly so as to rotate the plate 41 so as to properly align the plate's inlet hole 45 and outlet hole 47 with the cavity wall's inlet hole 21 and outlet hole 23. In this setting, the plate's tab 43 continues to not block the flow of water through the inlet diverter 19. Water is capable of entering the cavity 13 from the hollow handle, and water is further capable of passing through the inlet conduit 29 into the reservoir 75. Water mixes with the soap or shampoo within the reservoir before then travelling through the outlet conduit 31 to once again enter into the cavity 13. The mixture of water and shampoo or soap entering the cavity 13 then mixes with additional water still being introduced through the inlet diverter 19 before being sprayed through the showerhead's nozzles 11.

In still a third setting illustrated in FIG. 8, the switch's button 53 is pushed upwardly so as to rotate the plate 41 so as to block the cavity wall's inlet hole 21, and outlet hole 23. Furthermore, the plate's tab 43 is rotated to obstruct the inlet diverter 19. The inlet conduit 29 and outlet conduit 31 are completely blocked so that any shampoo within the reservoir 75 is incapable of entering into the cavity 13. In addition, the inlet diverter 19 is partially blocked by the tab 43, but a trickle of water is capable of entering into the cavity 13 which is then expelled through nozzles 11.

Advantageously, the showerhead assembly 1 of the present invention includes an integrated reservoir 75 for storing soap or shampoo. Furthermore, the reservoir is disengagable from the showerhead 5 so as to be easily filled or replaced with a prepackaged shampoo or soap container or the like.

A Second Embodiment of a Controller Assembly

Figure 23:
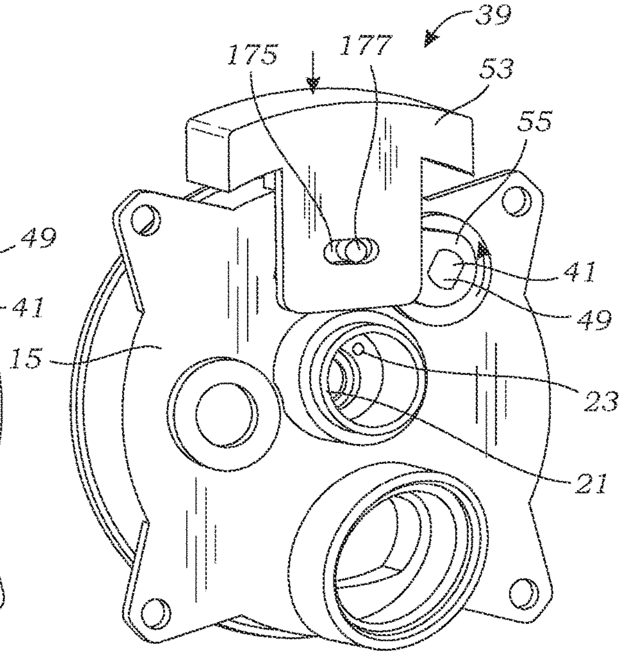
FIG. 23 is a backside perspective view of an exemplar embodiment of a showerhead assembly's controller, illustrating the push button being pressed downwardly and the obstructer plate rotating as a result.
Figure 24:
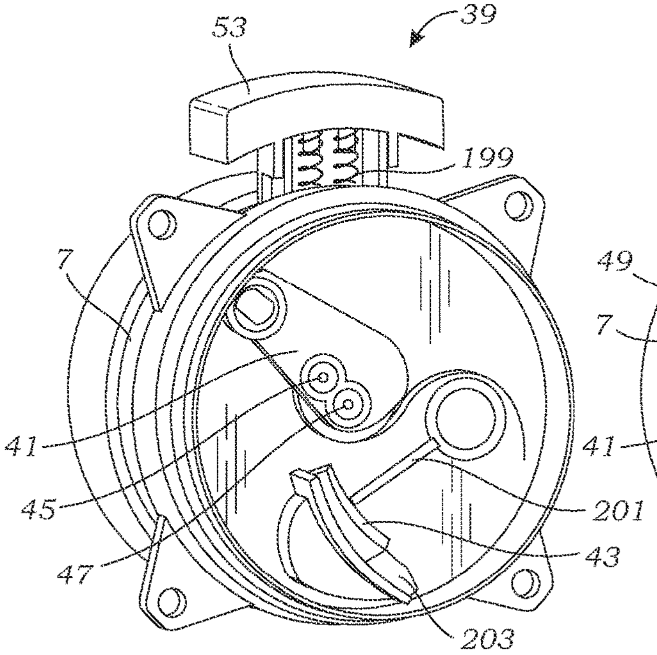
FIG. 24 is a front perspective view of an exemplar embodiment of a showerhead assembly's controller, illustrating the obstructer plate, wherein the push button is not pressed downwardly and the plate's inlet hole and outlet hole are not aligned with the cavity wall's inlet hole and outlet hole.
Figure 25:
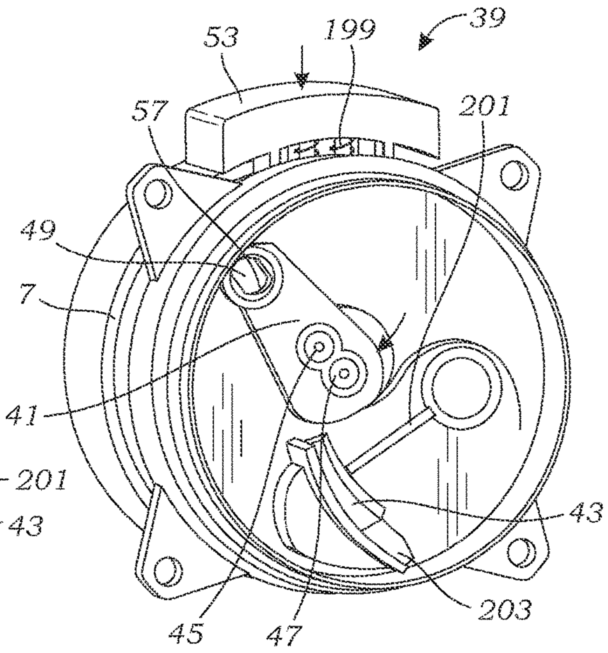
FIG. 25 is a front perspective view of an exemplar embodiment of a showerhead assembly's controller, illustrating the obstructer plate, wherein the push button is pressed downwardly and the obstructer plate is rotated so as to properly align the obstructer plate's inlet hole and outlet hole with the cavity wall's inlet hole and outlet hole.

With reference to the showerhead assembly 1 depicted in FIGS. 11-25, controller assembly 39 can include an obstructer plate 41 comprising a plate inlet hole 45 and a plate outlet hole 47 (best shown in FIGS. 24-25). In some embodiments, the obstructer plate 41 is rotatably attached to the cavity wall 15 by a pin 49 (best shown in FIGS. 22-23) which can pass through a circular hole 25 (not depicted) formed in the cavity wall. The obstructer plate 41 is capable of rotating about an axis defined by the pin 49 so as to enable one to selectively align the plate inlet hole 45 with the cavity wall inlet hole 21, and selectively align the plate outlet hole 47 with the cavity wall outlet hole 23. Once these holes are properly aligned, water from within the cavity 13 is capable of travelling through these holes. Furthermore, when the holes are aligned, water travels through the inlet conduit 29 so as to allow a mixture of water and shampoo or soap to form in the reservoir. The mixture of water and shampoo or soap then passes through outlet conduit 31 back into the cavity 13 so as to be dispensed from nozzles 11 and/or 111.

Figure 22:
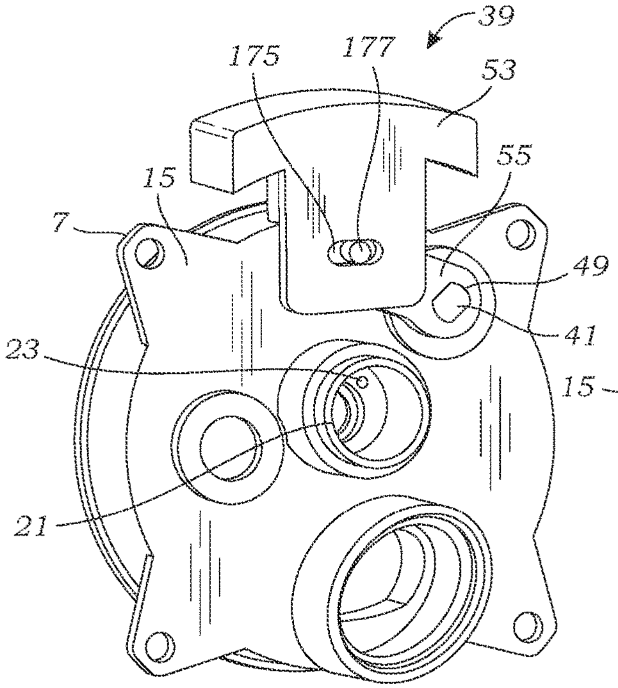
FIG. 22 is a backside perspective view of an exemplar embodiment of a showerhead assembly's cavity wall, illustrating the push button, lever arm, inlet hole, and primary outlet hole.

When shampoo or soap is not intended to be sprayed from the nozzles 11 and/or 111, the obstructer plate 41 is rotated so that plate inlet hole 45 does not align with the cavity wall inlet hole 21, and the plate outlet hole 47 does not align with the cavity wall outlet hole 23 (best shown in FIGS. 22 and 24).

As best depicted in FIGS. 22-25, rotation of the controller assembly's obstructer plate 41 is controlled by a button 53 and a lever arm 55. In some preferred embodiments, the button 53 is a push button 53. In some embodiments, the push button 53 is a spring-loaded push button 53 configured to protrude or extend outwardly from the housing 7. Specifically, a spring 199 is positioned between the push button 53 and lever arm 55. More specifically, a first end of a spring 199 is coupled to a bottom surface of the button 53 and a second end of the spring 199 is coupled to a portion of the lever arm 55. Even more specifically, the button 53 comprises a receiving hole 175 configured to receive a bar 177 extending from the lever arm 55. Even more specifically, when the push button 53 is pressed, the spring 199 compresses, thereby allowing the push button 53 to slide downwardly at least partially into the housing 7. In this manner, the downward movement of the push button 53 and compression of the spring 199 causes the lever arm 55 to pivot, thereby exerting a force on the obstructer plate 41 and causing the obstructer plate 41 to rotate. Conversely, when the push button 53 is not pressed by the user, the spring is in a decompressed state, allowing the push button 53 to protrude or extend outwardly from the housing 7.

Preferably, and as shown in FIGS. 22-25, the lever arm 55 has a hole 57 which is keyed to accept the obstructer plate's pin 49. According to an aspect of the embodiments, the controller assembly 39 preferably provides two settings. As illustrated in FIGS. 22 and 24, when the button 53 is positioned in a first setting, or when the button 53 has not been pressed by the user and is in its initial position, the plate's inlet hole 45 and outlet hole 47 are not aligned with the cavity wall's inlet hole 21 and outlet hole 23 (best shown in FIG. 24) so that water is prevented from flowing through the inlet conduit 29 and outlet conduit 31. In this manner, the obstructer plate 41 is configured to block said cavity wall's inlet hole 21 and outlet hole 23. Though water is capable of entering the cavity 13 from the hollow handle 61 and then expelling through nozzles 11 and/or 111, any soap or shampoo within the reservoir 75 is not capable of being introduced into the flow of water expelled from the nozzles 11 and/or 111. In this manner, the soap or shampoo within the reservoir 75 remains in the reservoir 75.

In a second setting, and as best illustrated in FIGS. 23 and 25, the push button 53 is depressed downwardly so as to pivot the lever arm 55, thereby causing the obstructer plate 41 to rotate so as to properly align the plate's inlet hole 45 and outlet hole 47 with the cavity wall's inlet hole 21 and outlet hole 23 (best shown in FIG. 25). In this second setting, water is capable of entering the cavity 13 from the hollow handle 61, and water is further capable of passing through the inlet conduit 29 into the reservoir 75. Water mixes with the soap or shampoo within the reservoir 75 before then travelling through the outlet conduit 31 to once again enter into the cavity 13. The mixture of water and shampoo or soap entering the cavity 13 then mixes with additional water still being introduced through the inlet diverter 19 before being sprayed through the showerhead's nozzles 11 and/or 111.

In some embodiments, and as illustrated in FIGS. 11-13, and 17-21, the showerhead assembly 1 can further comprise a flow setting assembly 200 for variably controlling the pressure/flow of water through the nozzles 11 and/or 111. The flow setting assembly 200 can include a diverter plate 201 which can selectively be rotated to cover the cavity wall's inlet diverter 19. Specifically, the diverter plate 201 is rotatably attached to the cavity wall 15 by a notch 202. Further, the diverter plate 201 can include a tab 43 that is configured to slide along a ledge extending from the cavity wall 15. More specifically, the tab 43 slides in response to the diverter plate 201 rotating. Even more specifically, the inlet diverter 19 is disposed along a portion of the ledge 203. In some embodiments, the inlet diverter 19 is disposed in an inner chamber 204 of the ledge 203. In this manner, the tab 43 is configured to slide along the ledge 203 so as to variably align and/or block the flow of water from the inlet diverter 19. In some embodiments, the diverter plate 201 is capable of rotating about an axis defined by a notch 202 so as to enable one to selectively align the tab 43 with the inlet diverter 19.

Rotation of the diverter plate 201 (and sliding of the tab 43 along the ledge 203) is controlled by a switch 210 having a switch button 211 and a control arm 212. Preferably, though not illustrated, the control arm 212 has an opening 213 which is keyed to accept the notch 202. In this manner, the control arm 212 is operatively coupled with the diverter plate 201 and can control its movement. In preferred embodiments, the control arm 212 can be moved up and down so as to change and control water flow/pressure settings. Specifically, the switch button 211 can move between a plurality of positions. More specifically, the switch button 211 can move anywhere between a first position and a second position. Further, the control arm 212 moves up and/or down as a function of the movement of the switch button 211.

Figure 17:
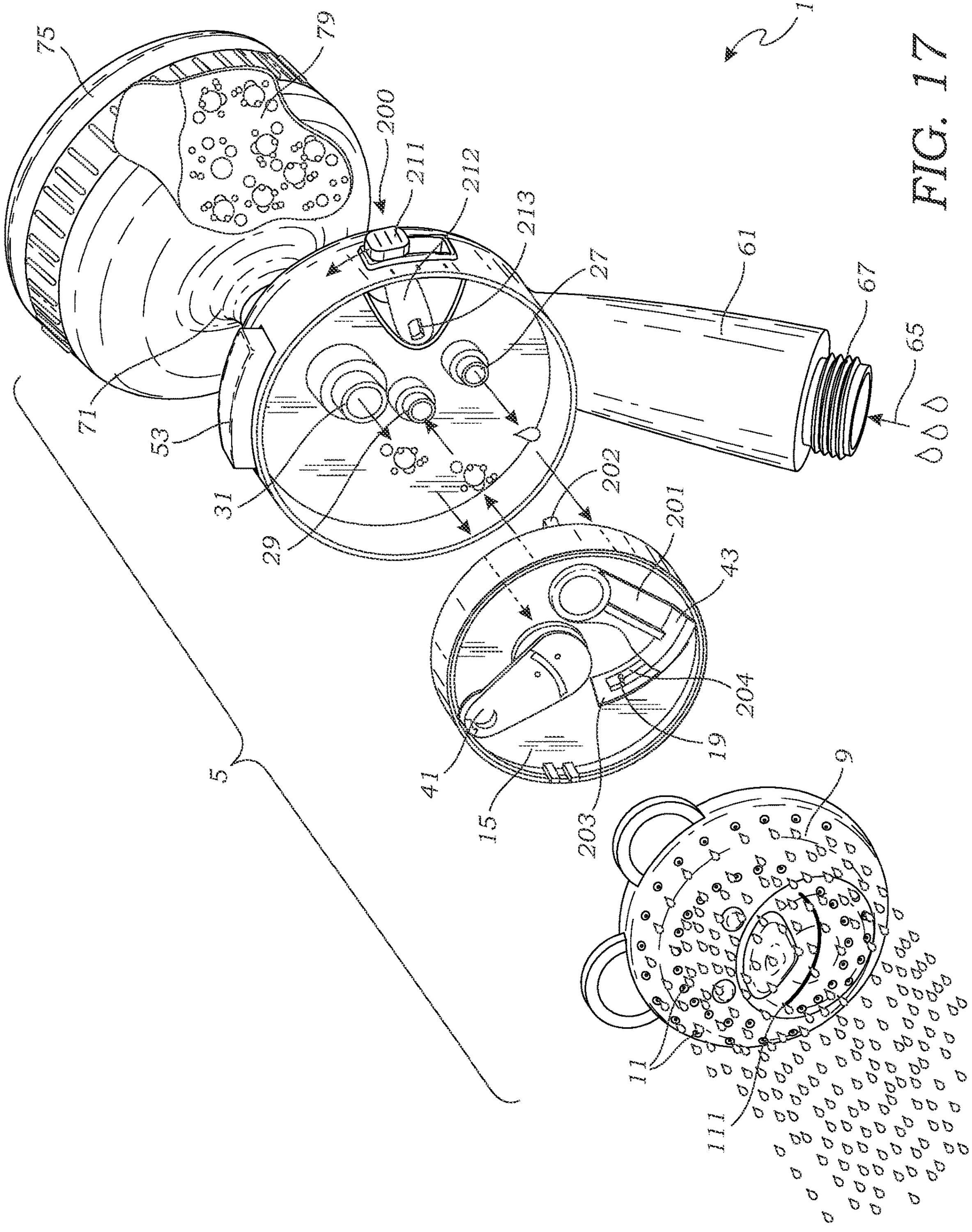
FIG. 17 is an exploded front perspective view of an exemplar embodiment of a showerhead assembly, illustrating the switch button in the first position, wherein water is spraying from nozzles at a maximum water pressure.
Figure 18:
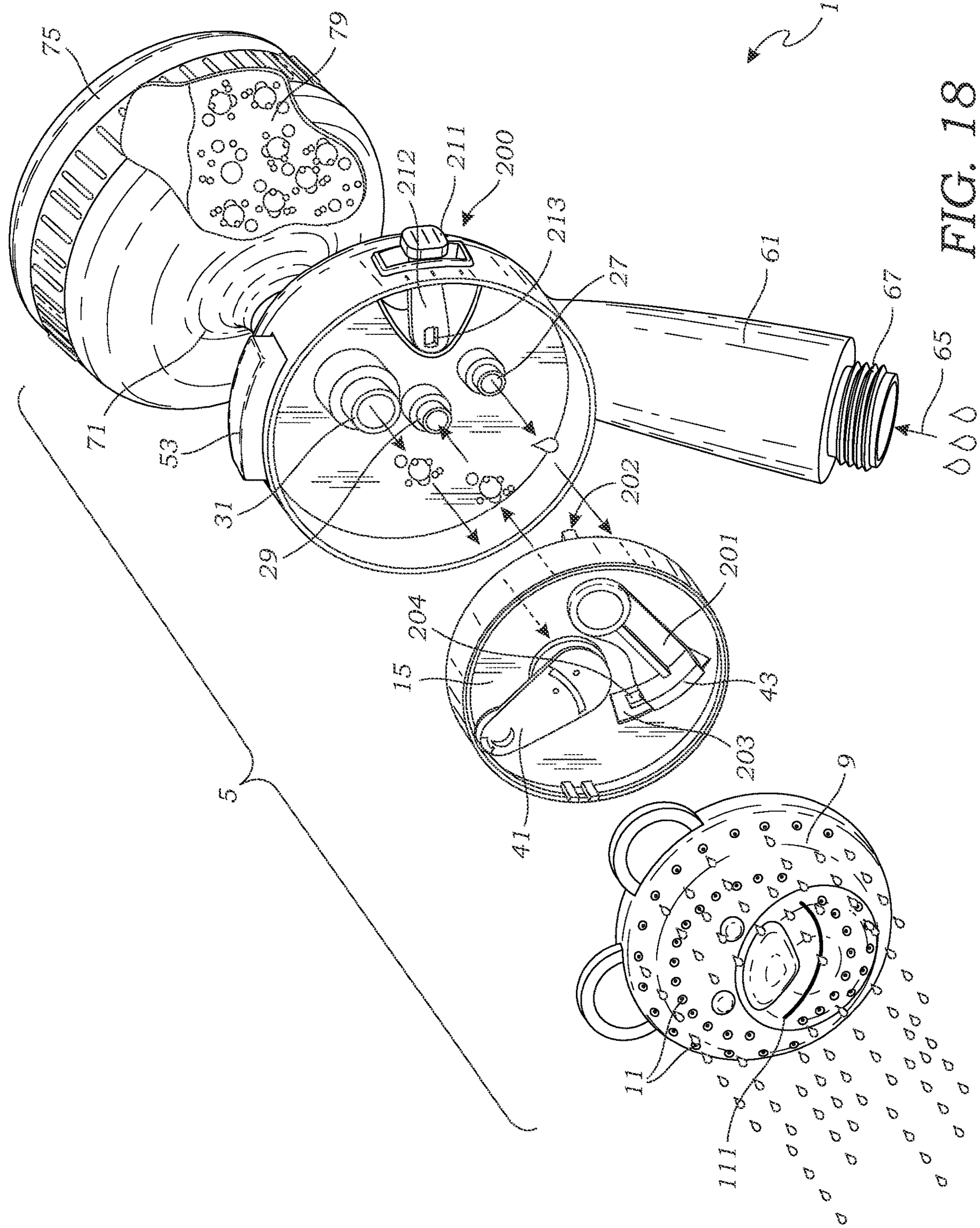
FIG. 18 is an exploded front perspective view of an exemplar embodiment of a showerhead assembly, illustrating water spraying therefrom.
Figure 19:
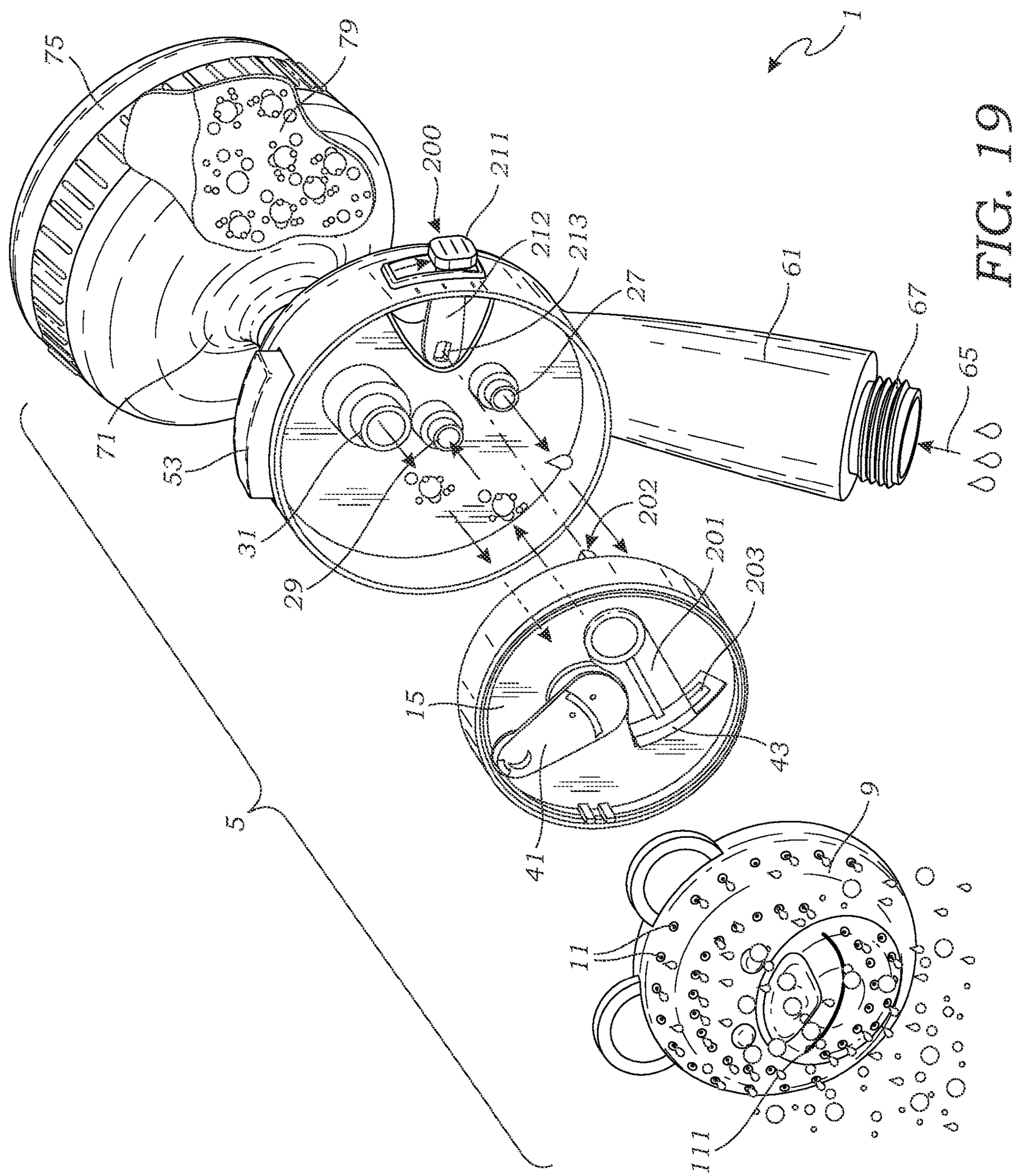
FIG. 19 is an exploded front perspective view of an exemplar embodiment of a showerhead assembly, illustrating the switch button in a second position, wherein the water is expelling from nozzles in a trickling fashion.
Figure 20:
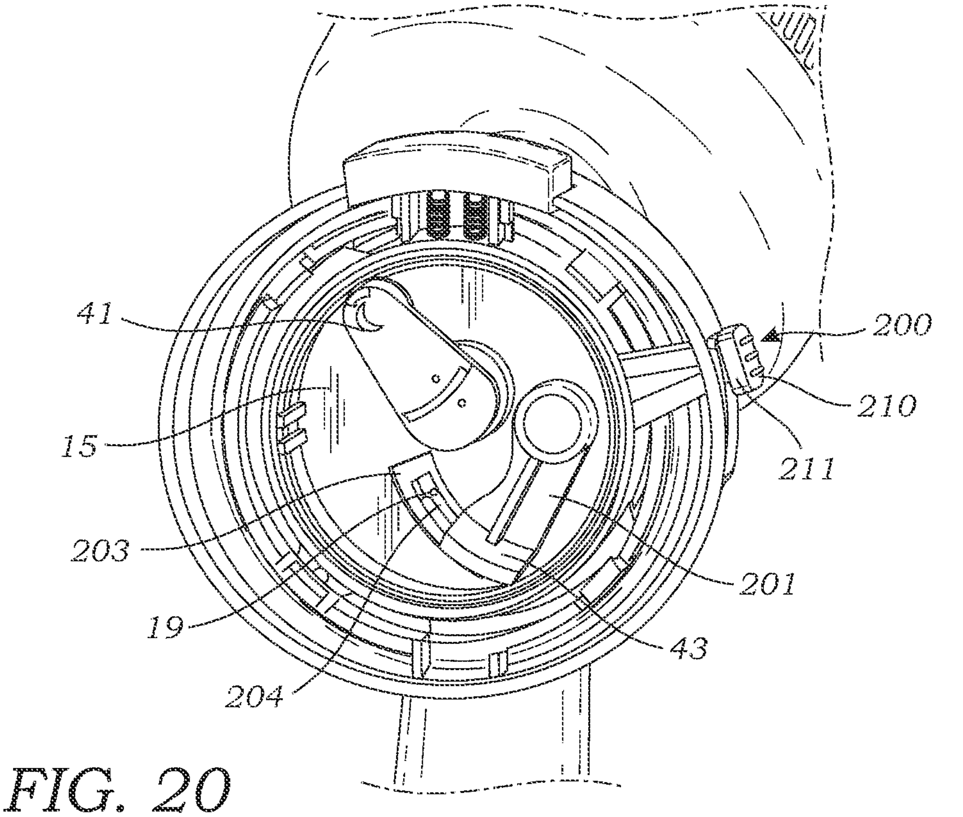
FIG. 20 is a perspective view of an exemplar embodiment of a showerhead assembly's flow setting assembly including cavity wall and diverter plate, illustrating the tab not blocking the inlet diverter.
Figure 21:
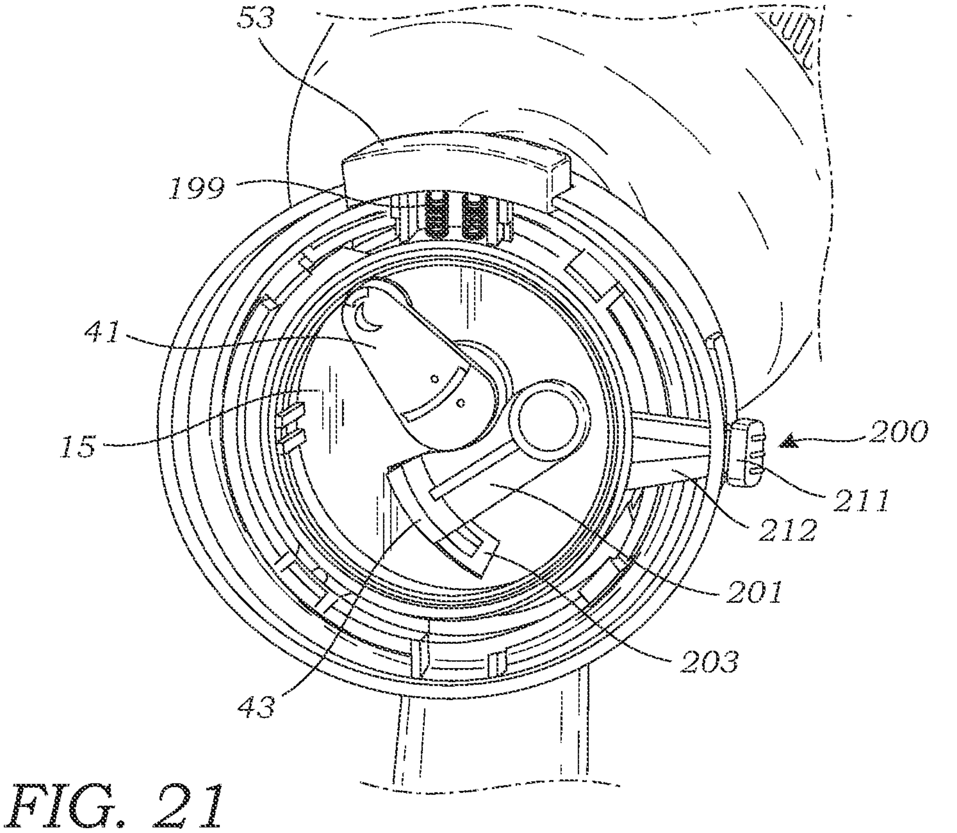
FIG. 21 is a perspective view of an exemplar embodiment of a showerhead assembly's flow setting assembly including cavity wall and diverter plate, illustrating the inlet diverter blocked by the tab.

In some exemplar embodiments, when the switch button 211 is in the first position (shown in FIG. 17), the control arm 212 is oriented such that the diverter plate's tab 43 does not block the inlet diverter 19 so that water is capable of entering the cavity 13 from the hollow handle 61, and the water is then capable of expelling through nozzles 11 and/or 111. In the first position, and as best shown in FIG. 17, water is able to expel through nozzles 11 and/or 111 at maximum water pressure. Further, in some exemplar embodiments, when the switch button 211 is in a second position (shown in FIG. 19), the control arm 212 is positioned such that the tab 43 is configured to at least block or partially block the inlet diverter 19. In this regard, a trickle of water is capable of entering into the cavity 13, which is then expelled through nozzles 11 and/or 111 at a minimum water pressure. In some embodiments, and as best shown in FIG. 19, in the second position, water sprays through the nozzles 11 and/or 111 in a trickling fashion.

Moreover, in some exemplar embodiments, when the switch button 211 is in a position between the first position and the second position (shown in FIG. 18), the control arm 212 is positioned such that the tab 43 is configured to block the inlet diverter 19 less than it would in the second position, and more than it would in the first position. As such, water can be expelled through nozzles 11 and/or 111 at a pressure level between the maximum water pressure and the minimum water pressure. In some embodiments, water is configured to spray from the nozzles 11 and/or 111 while the switch button 211 is at any position.

Those of skill in the art will appreciate that the user can move the switch button 211 to various different positions between the first position and the second position so as to select a desired water pressure between the maximum water pressure and minimum water pressure.

Further, those of skill in the art will recognize that other means aside from a diverter plate 201 and tab 43 can be utilized to align and or block the inlet diverter 19 so as to vary the water pressure and/or flow without departing from the scope of the disclosure.

Advantageously, the showerhead assembly 1 of the present invention includes an integrated reservoir 75 for storing soap or shampoo. Furthermore, the reservoir 75 is disengagable from the showerhead 5 so as to be easily filled or replaced with a prepackaged shampoo or soap container or the like.

While preferred showerhead assemblies have been illustrated and described, it would be apparent that various modifications can be made without departing from the spirit and scope of the invention. Still alternative embodiments may be envisioned by those skilled in the art after consideration of the present disclosure. For example, a showerhead assembly of the present invention may include two or more reservoirs instead of just a single reservoir. Such a multi-reservoir showerhead assembly would include an additional inlet conduit and an additional outlet conduit which extend through the transition section to connect each additional reservoir to the showerhead's cavity. In addition, the controller assembly would be modified, such as by including additional holes in the obstructer plate, to selectively allow or obstruct fluids from flowing from the additional reservoirs through the additional conduits to the cavity. Thus, the present showerhead assembly is not intended to be limited to the single reservoir construction which is primarily described and illustrated herein.

It will be understood by those of skill in the art that any of the showerhead assemblies described herein, are meant to be illustrative only, and that the individual elements, or any combination of elements, depicted and/or described for a particular embodiment or figure are freely combinable with any other element, or any combination of other elements, depicted and/or described with respect to any of the other embodiments.

Accordingly, it will be apparent that various modifications can be made without departing from the spirit and scope of the invention. Therefore, having described my invention in such terms such as to enable a person skilled in the art to understand the invention, recreate the invention and practice it, and having presently identified the presently preferred embodiment thereof, I claim:

The invention claimed is:

1. The showerhead assembly comprising:

a hollow handle having a primary water conduit configured to receive water from a water source;

a showerhead affixed to a distal end of said hollow handle, said showerhead having a housing, a face, one or more nozzles which extend from said face, and a cavity wall within said housing which forms a cavity between said face and said cavity wall, said cavity wall includes a water supply hole in fluid communication with said primary water conduit, an inlet hole in fluid connection with an inlet conduit, and an outlet hole in fluid connection with an outlet conduit;

a transition section including said inlet conduit connected to said cavity wall's inlet hole and said outlet conduit connected to said cavity wall's outlet hole;

a reservoir connected to said transition section, said reservoir including a central chamber wherein soap or shampoo can be stored, wherein said reservoir is connected to said cavity by said inlet conduit and said outlet conduit;

wherein water is capable of flowing through said central channel to fill said showerhead cavity before being expelled through said nozzles or flowing through said cavity wall inlet hole and said transition section inlet conduit into said reservoir and then flowing through said transition section outlet conduit and said cavity wall outlet hole into said showerhead cavity and then being expelled through said nozzles; and a controller assembly configured to selectively allow or block said water to enter said reservoir through said inlet conduit and mix with said soap or shampoo in said reservoir, wherein said controller assembly is further configured to selectively allow or block said mix of water and soap or shampoo to enter said cavity through said outlet conduit for expellation through said one or more nozzles.

2. The showerhead assembly of claim 1, wherein said controller assembly includes at least two settings, wherein in a first setting, said soap or shampoo in said reservoir is configured to remain in said reservoir, and wherein in a second setting, water enters said reservoir and mixes with said soap or shampoo, and wherein in the second setting, said mix of water and said soap or shampoo is configured to enter said cavity for expellation through said one or more nozzles.

3. The showerhead assembly of claim 1, wherein said controller assembly comprises an obstructer plate including a plate inlet hole and a plate outlet hole, said obstructor plate rotationally affixed to said cavity wall so as to provide said obstructor plate with a rotational axis about which said obstructor plate rotates, and wherein said obstructer plate is configured to rotate to a first position wherein said obstructor plate blocks said cavity wall's inlet hole and said cavity wall's outlet hole, and wherein said obstructer plate is further configured to rotate to a second position wherein said plate inlet hole aligns with said cavity wall's inlet hole and wherein said plate outlet hole aligns with said cavity wall's outlet hole.

4. The showerhead assembly of claim 3, wherein said controller assembly comprises a lever arm and a button configured to be pressed by a user, wherein rotation of said obstructer plate is controlled by said button and said lever arm.

5. The showerhead assembly of claim 4, wherein upon said button being pressed by said user, said obstructer plate is configured to rotate such that said plate inlet hole aligns with said cavity wall's inlet hole and said plate outlet hole aligns with said cavity wall's outlet hole, or wherein upon said button being pressed by said user, said obstructer plate is configured to rotate such that said plate inlet hole does not align with said cavity wall's inlet hole and said plate outlet hole does not align with said cavity wall's outlet hole.

6. The showerhead assembly of claim 4, wherein upon said button being in an initial position, said obstructer plate is configured to block said cavity wall's inlet hole and said cavity wall's outlet hole.

7. The showerhead assembly of claim 4, wherein said button is a push button, and wherein a spring is positioned between said push button and said lever arm.

8. The showerhead assembly of claim 1, further comprising a flow setting assembly configured to control water pressure.

9. The showerhead assembly of claim 8, wherein said water supply hole includes an inlet diverter configured to expel water throughout said cavity, wherein the flow setting assembly comprises a diverter plate rotatably attached to said cavity wall, and wherein said diverter plate comprises a tab configured to slide along a ledge extending from said cavity wall.

10. The showerhead assembly of claim 9, wherein said inlet diverter is disposed in an inner chamber of said ledge, and wherein said tab is configured to variably block said inlet diverter as it slides along said ledge.

11. The showerhead assembly of claim 10, wherein rotation of said diverter plate is controlled by a switch button and a control arm operatively coupled with said diverter plate, wherein said switch button is configured to move between a plurality of positions, and wherein said control arm moves in response to movement of said switch button between said plurality of positions.

12. The showerhead assembly of claim 11, wherein said button is further configured to move to a first position, wherein in said first position, said control arm is oriented such that said tab does not block said inlet diverter and water is configured to expel through said one or more nozzles at a maximum water pressure.

13. The showerhead assembly of claim 11, wherein said button is further configured to move to a second position, wherein in said second position, said control arm is oriented such that said tab at least partially blocks said inlet diverter and water is configured to expel through said one or more nozzles at a minimum water pressure.

14. The showerhead assembly of claim 1, further comprising one or more supplementary nozzles, wherein said one or more supplementary nozzles are configured to disperse water in a different spray type than said one or more nozzles.

15. The showerhead assembly of claim 1, wherein said face is configured to rotate along a central axis of said housing, wherein a spray setting of said showerhead assembly is configured to change in response to rotation of said face.

16. The showerhead assembly of claim 15, wherein said showerhead assembly comprises a first spray setting configured to spray water from said one or more nozzles in a waterfall spray fashion when said face is positioned at 0° relative to said central axis, and wherein said showerhead assembly comprises a second spray setting configured to spray water from said one or more nozzles in a wide-stream fashion when said face is positioned 45° relative to said central axis.

* * * * *